(12) United States Patent
Iwata et al.

(10) Patent No.: US 7,339,588 B2
(45) Date of Patent: Mar. 4, 2008

(54) CHARACTER IMAGE GENERATING SYSTEM, STORAGE MEDIUM STORING CHARACTER IMAGE GENERATING PROGRAM AND METHOD

(75) Inventors: Satoshi Iwata, Kawasaki (JP); Yoshiyuki Okada, Kawasaki (JP); Masashi Takechi, Osaka (JP)

(73) Assignee: Fujitsu Limited, Kawasaki (JP)

( * ) Notice: Subject to any disclaimer, the term of this patent is extended or adjusted under 35 U.S.C. 154(b) by 11 days.

(21) Appl. No.: 11/237,758

(22) Filed: Sep. 29, 2005

(65) Prior Publication Data

US 2006/0221080 A1    Oct. 5, 2006

(30) Foreign Application Priority Data

Mar. 31, 2005    (JP)    ............... 2005-103925

(51) Int. Cl.
   *G06T 11/00*    (2006.01)
(52) U.S. Cl. ...................... 345/467; 345/442
(58) Field of Classification Search ........... 345/442, 345/467
   See application file for complete search history.

(56) References Cited

U.S. PATENT DOCUMENTS

| | | | | |
|---|---|---|---|---|
| 5,309,521 A | * | 5/1994 | Matsukawa | 345/469 |
| 5,381,521 A | * | 1/1995 | Ballard | 345/442 |
| 5,404,431 A | | 4/1995 | Kumazaki et al. | |
| 5,611,036 A | * | 3/1997 | Berend et al. | 345/441 |
| 5,859,647 A | * | 1/1999 | Kurumida | 345/442 |
| 5,900,884 A | * | 5/1999 | Minami et al. | 345/442 |
| 5,959,635 A | | 9/1999 | Watanabe et al. | |
| 6,384,745 B1 | | 5/2002 | Azam et al. | |
| 6,577,253 B2 | | 6/2003 | Azam et al. | |
| 6,614,940 B2 | | 9/2003 | Azam et al. | |
| 6,972,764 B1 | * | 12/2005 | Browne | 345/467 |

FOREIGN PATENT DOCUMENTS

| | | |
|---|---|---|
| JP | 5-019739 | 1/1993 |
| JP | 5-143742 | 6/1993 |
| JP | 5-188911 | 7/1993 |
| JP | 9-106272 | 4/1997 |
| JP | 10-228537 | 8/1998 |
| JP | 2000-322586 | 11/2000 |
| JP | 2004-146452 | 5/2004 |

OTHER PUBLICATIONS

James D. Foley, et al., "Computer Graphics: Principles and Practice (Second Edition in C)", Ohmsha, Mar. 2001, pp. 488-490.

(Continued)

*Primary Examiner*—Kee M. Tung
*Assistant Examiner*—Motilewa Good-Johnson
(74) *Attorney, Agent, or Firm*—Staas & Halsey LLP

(57) ABSTRACT

The present invention is a character image generation system for generating outline font based on character information and displaying the outline font on a display with a prescribed number of pixels. The character image generation system subdivides a curve expressed by character outline information corresponding to inputted character information, calculates the difference between coordinates at each end of the subdivided curve, compares the difference with a predetermined threshold value and sequentially calculates coordinates for each pixel, based on this comparison result.

20 Claims, 30 Drawing Sheets

OTHER PUBLICATIONS

Haruhiko Okumura, et al., "Encyclopedia of Java-based Algorithm", Gijutsu-Hyohron Co., Ltd., May 8, 2003, pp. 146-150.

Satoru Kubota, "Ecology of Liquid Crystal Display—a viewpoint to a user-centered display technology", Institute for Science of Labor Publishing Department, Mar. 1998, pp. 116-125.

Satoru Kubota, "Effects of Character Size, Character Format, and Pixel Density on Subjective Legibility of Reflective Liquid Crystal Displays for Personal Digital Assistants", Journal of the Institute of Image Information and Television Engineers, vol. 55, No. 10, 2001, pp. 1363-1366.

K. T. Spoehr, et al.,, "Visual Information Processing: Telephone & Beyond", Saiensu-sha Co., Ltd., Dec. 1986, pp. 36-37.

U.S. Appl. No. 11/063,843, filed Feb. 23, 2005, Satoshi Iwata, et al.

Korean Office Action, mailed Jul. 10, 2007 and issued in corresponding Korean Patent Application No. 10-2005-0086441.

* cited by examiner

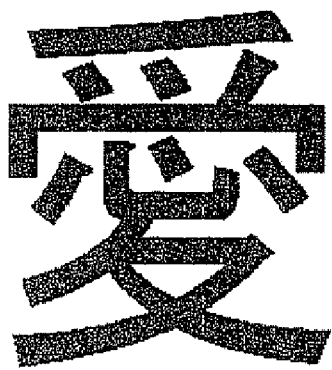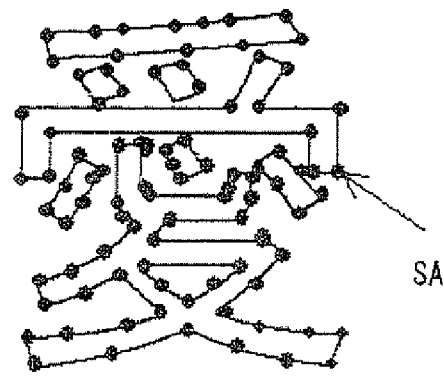
SAMPLE POINT
FIG. 2
PRIOR ART

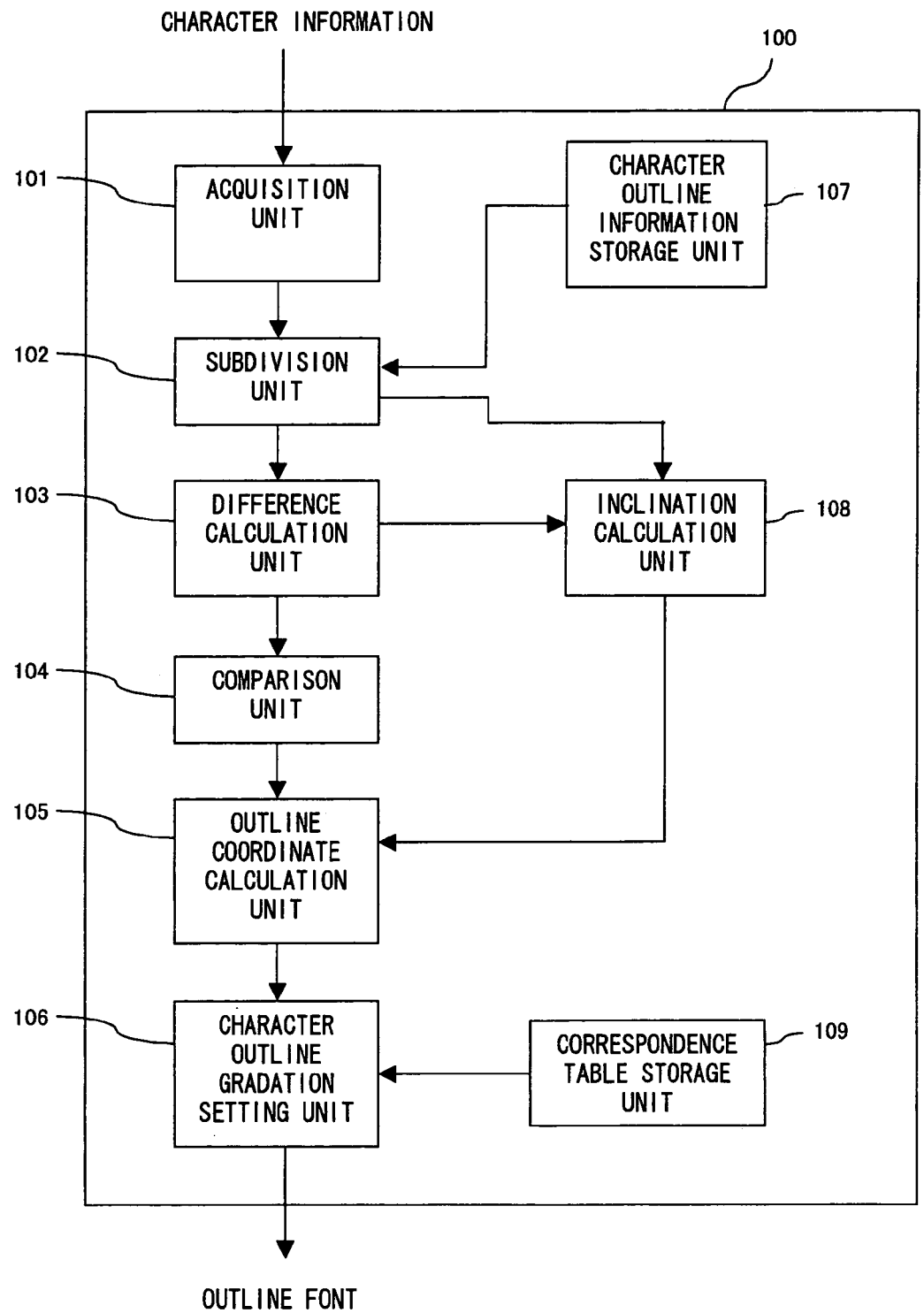
F I G. 6

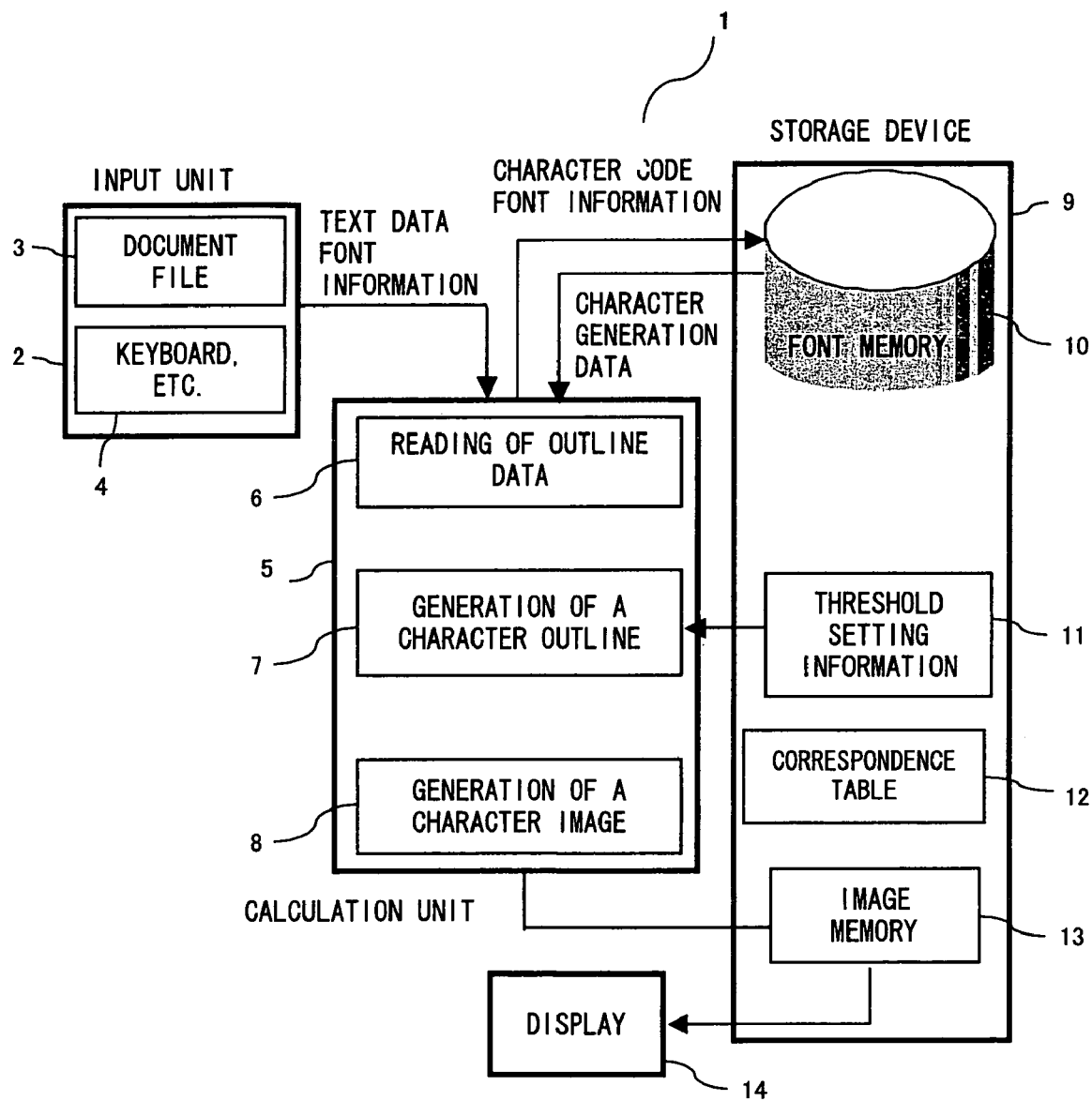
F I G. 7

(K. T. SPOEHR AND S. W. LEHMKUHLE,
"INFORMATION PROCESSING OF VISUAL ANGLE")

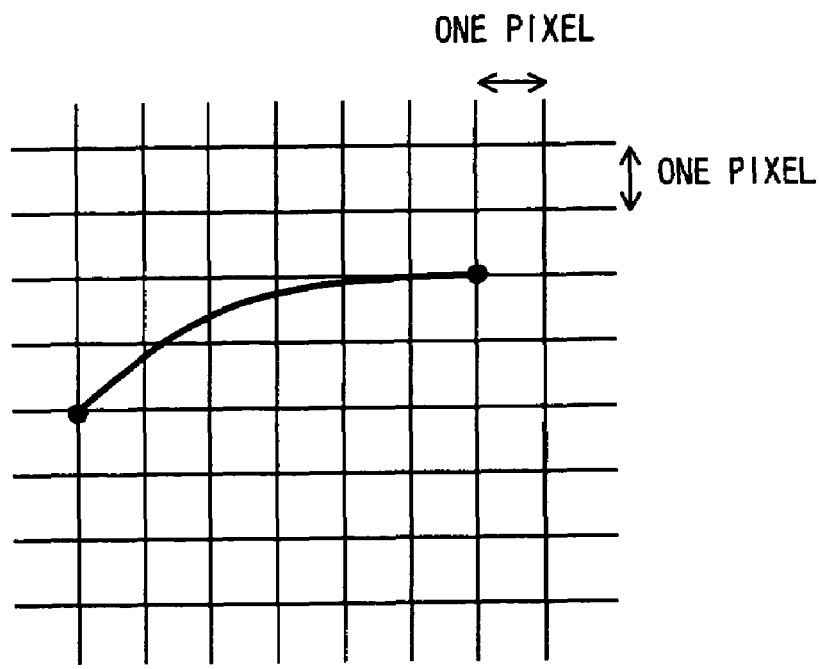
F I G. 1 1 A
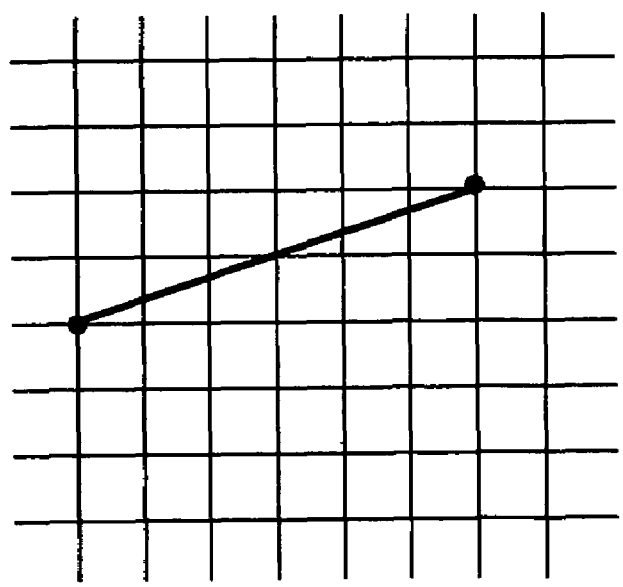
F I G. 1 1 B

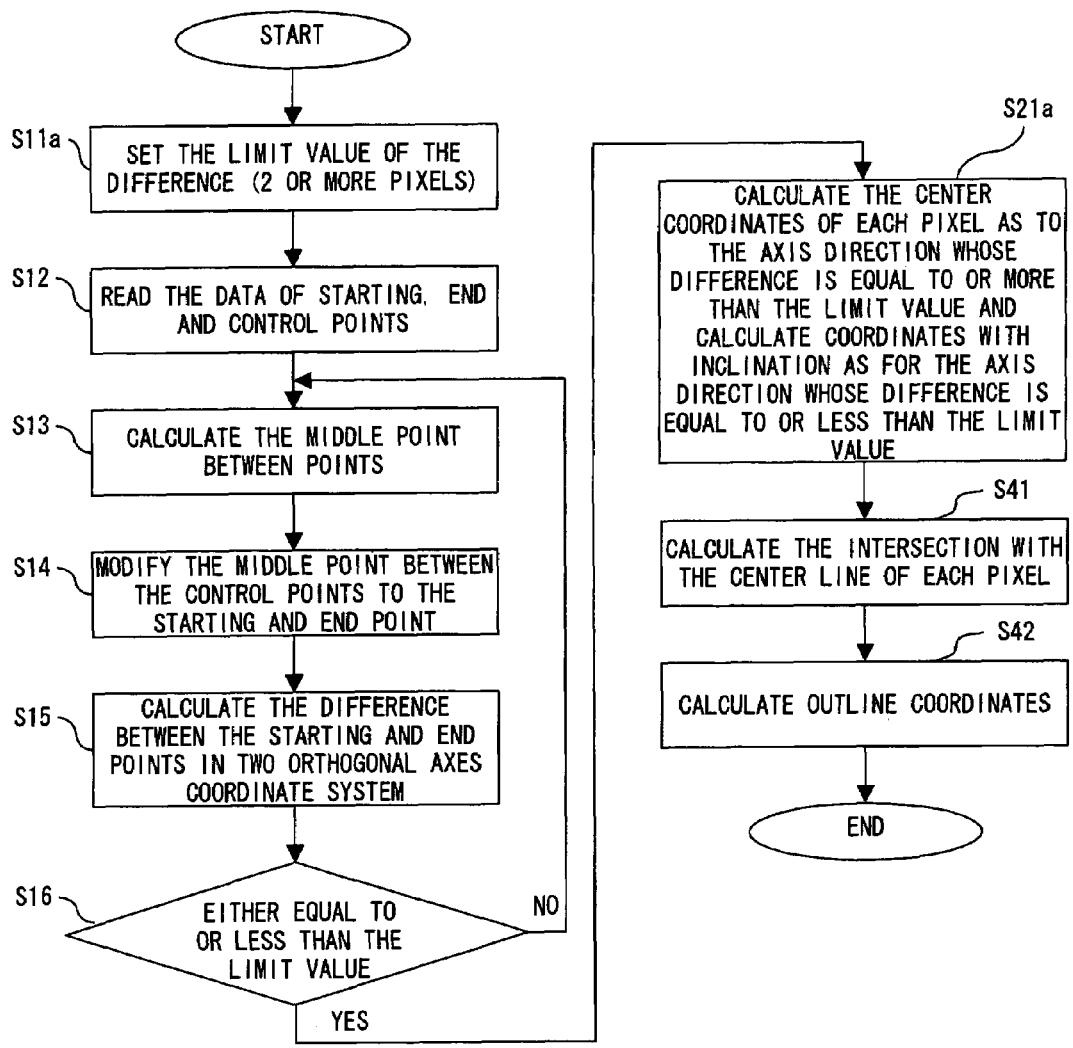
F I G. 1 8

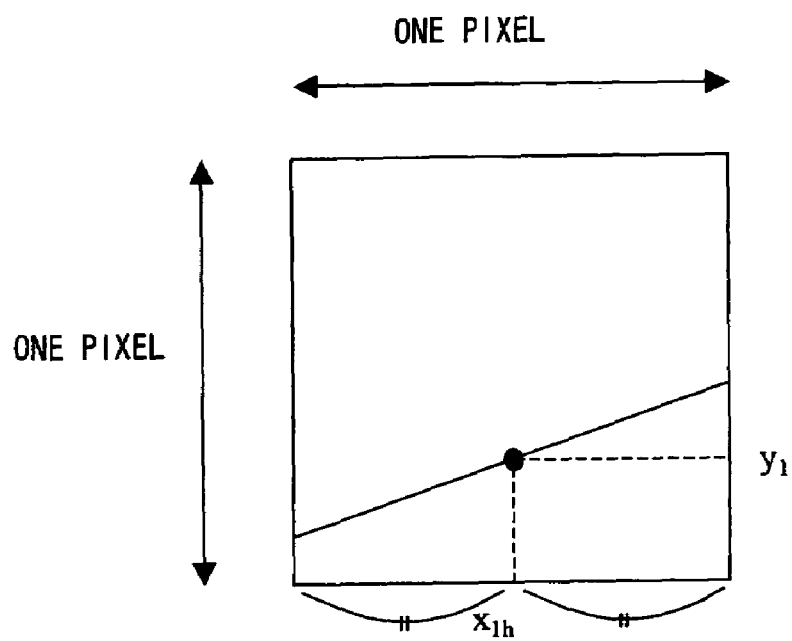
F I G. 2 1 A
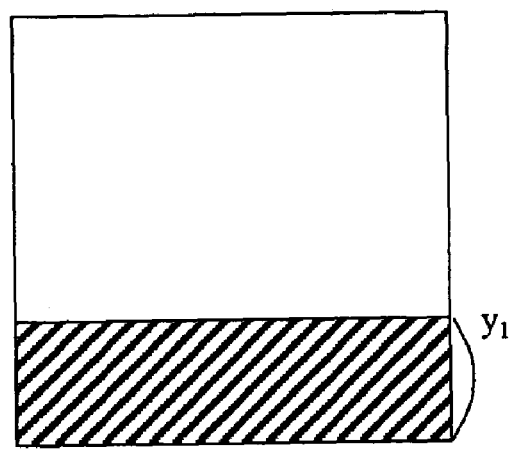
F I G. 2 1 B

| GRADATION VALUE | AREA RATIO |
|---|---|
| 0 | 0 |
| 1 | 1/255 |
| 2 | 2/255 |
| 3 | 3/255 |
| 4 | 4/255 |
| 5 | 5/255 |
| 6 | 6/255 |
| 7 | 7/255 |
| . | . |
| . | . |
| . | . |
| . | . |
| 255 | 1 |

F I G. 29

| GRADATION VALUE | AREA RATIO |
|---|---|
| 0 | 0 |
| 1 | 0 |
| 2 | 0 |
| 3 | 0.004 |
| 4 | 0.005 |
| 5 | 0.006 |
| 6 | 0.008 |
| 7 | 0.010 |
| . | . |
| . | . |
| . | . |
| . | . |
| . | . |
| 255 | 1 |

FIG. 30

CHARACTER IMAGE GENERATING SYSTEM, STORAGE MEDIUM STORING CHARACTER IMAGE GENERATING PROGRAM AND METHOD

BACKGROUND OF THE INVENTION

1. Field of the Invention

The present invention relates to the generation of character images.

2. Description of the Related Art

The spread of portable equipment, such as a cellular phone, a personal digital assistant (PDA) and the like, is remarkable. Therefore, attention is paid to character images displayed on a portable equipment-mounted flat panel type display device used for portable equipment.

Conventionally, in portable equipment, dot font has been used as character to be installed inside beforehand and be displayed since its processing capacity is low. Conventionally, the processing capacity and graphic performance of built-in equipment is low. Therefore, the use of dot font by which a necessary character image can be stored in memory without being processed and be developed on a screen was efficient.

However, character images with a design could not be expressed in a binary image by dot font.

FIG. 1 shows jaggies caused by the change of resolution when using dot font. As shown in FIG. 1, the lower resolution is (the larger the number of dots is), the coarser displayed characters become.

The high liquid crystal device (LCD) panel resolution of a cellular phone in the market is approximately 140 ppi. When displaying characters of approximately 3.5 millemeters, which can be easily seen on an LCD screen, the size of pixels constituting one character on the above-mentioned panel is approximately 20 dots by 20 dots. The large number of strokes (number of sides) of a Japanese character is approximately 10 to 12. Therefore, when displaying a complex character with a large number of strokes, the character had to be deformed. For example, a part of the character had to be omitted.

Recently, the resolution of an LCD panel used for built-in equipment has exceeded 180 dpi and the number of clocks as the processing capacity of a CPU has increased to 100 to 200 MHz, which is a PC level 10 years ago. Therefore, a graphic library could be made operable. In cellular phones, the demand of character images with a design has increased. Furthermore, with the promotion of a fine screen, the capacity of character images has increased, which has raised a problem of the shortage of memory capacity. In such a situation, recently needs for installing outline font in built-in equipment have increased.

In order to faithfully reproduce a character design, a method for digitalizing curves composing a character and reproducing its character shape according to a supplied character size is generally used. The outline font is used one example of such a method (for example, see Japanese Published Patent Application Nos. 05-019739 and H05-143742).

The outline of the outline font is digitalized as a straight line and an approximate curve. Typical approximation curves include Bezier curve, spline curve and the like. In the case of the Bezier curve, as data, a starting point, an endpoint and several control points for interpolating between them are used. A closed curve can be calculated by using these points and a character image can be generated by painting over the inside of the closed curve.

FIG. 2 shows an example of a character expressed by the functional expression of Bezier curve. As shown in FIG. 2, a Chinese character is composed of a plurality of points and curves between them. As a curve generating method for generating the outline of outline font, a typical Bezier curve generation method is described below.

FIG. 3 is an example of the flowchart showing the reproduction process of Bezier curve reproduced by built-in equipment. FIG. 3 is described with reference to FIGS. 4 and 5. Firstly, the control device in built-in equipment reads the data of predetermined starting point, end point and control points (step 201, hereinafter a step is called "S").

FIG. 4 explains the functional expression of Bezier curve. Bezier curve is used in PostScript font and the like. A used Bezier function expresses a cubic approximate curve. If it is assumed that the starting point, end point and two control points of the curve are $(x_1, y_1)$, $(x_4, y_4)$, and $(x_2, y_2)$ and $(x_3, y_3)$, respectively, coordinates on Bezier curve, that is, coordinates $(x, y)$ on a character coordinate system is expressed as follows.

$$X = (1-t)^3 x_1 + (1-t)^3 t X_2 + 3(1-t)t^2 x_3 + t^3 X_4 \qquad (1)$$

$$y = (1-t)^3 y_1 + (1-t)^3 t y_2 + 3(1-t)t^2 y_3 + t^3 y_4 \qquad (2)$$

$$0 \leq n \ t \leq 1 \qquad (3)$$

FIG. 5 explains the subdivision method of Bezier curve. As shown by equations (1) through (3), coordinates constituting Bezier curve are calculated using t as a parameter. In the actual calculation, each of the starting point, end point and control points of the curve is subdivided and the coordinates of each control point are calculated. Then, each distance between the control points is calculated, and if the distance is less than the pixel size of a display, the calculation terminates. If the distance exceeds the pixel size, the distance is further subdivided and its coordinate position is calculated.

FIG. 5 is described in detail below. Firstly, a starting point, two control points and end point are assumed to be P1, P2, P3 and P4, respectively. By calculating the middle points these points (S202), middle points P5, P6 and P7 can be obtained between P2 and P3, P3 and P4, and PS and P6, respectively. Furthermore, middle points P8, P9 and P10 can be obtained between P5 and P6, P6 and P7, and P8 and P9, respectively.

P10 is used as its end point on the dividing line 1 side, and as its starting point on the dividing line 2 side (S203). Specifically, on the dividing line 1 side, starting point, two control points and end point are P1, P5, P8 and P10, respectively. On the dividing line 2 side, they are P10, P9, P8 and P4, respectively.

Then, the distance (length) between the starting and end points is calculated (S204), and S202 through S204 are repeated until the length drops below the pixel size of a display (S205). In this way, a closed line is sequentially subdivided and the subdivided length is always monitored. Then, when the length drops below the pixel size, the subdivision is suspended.

As described above, in outline font, an outline is formed by several pieces of control point information. Since a personal computer has sufficient processing capacity, time needed to generate a character outline can be minimized up to a level sensed by human being.

The reference literatures of the present invention are shown below.

James D. Foley et al., "Computer Graphics Theory and Practice" Ohm Corporation.

Haruhiko Okumura et al., "Algorithm Encyclopedia by Java", Technical Criticism Corporation Satoru Kubota, "Ecology of LCD Display", Publishing Department, Labor Science Laboratory.

Satoru Kubota, "Character Size, Character Pixel Composition, and Relationship Between Pixel Density and Easiness to Read, of Small Reflective LCD", Video Information Media Academic Journal, Vol. 55, No. 10, pp. 1363-1366 (October 2001).

Kathryn T. Spoehr and Stephen W. Lehmkuhle, "Information Processing of Visual Angle-Visual-Software of Seeing" translated by Naoyuki Imosake et al., Science Corporation (1986).

However, built-in equipment, such as a cellular phone or the like, has as much processing capacity as a personal computer. For example, the operating frequency of a cellular phone is less than $\frac{1}{10}$ of that of a personal computer, and its actual processing capacity is far less that. Therefore, in many cases, the same generation method as a personal computer can display no character image within time needed for human eyes to sense (0.2 seconds), the improvement of whose processing speed is a problem.

Of the outline font generation process, the outline generation process and gradation process take much processing time. The outline generation process must perform the distance calculation of divided lines for the entire outline. The gradation process must also perform the calculation for the entire outline as well as the outline generation process.

SUMMARY OF THE INVENTION

The present invention provides a character image generation program for shortening outline font generation time, a system thereof and a method thereof. Furthermore, it provides a character image generation program for shortening its gradating operation processing time, a system thereof and a method thereof.

According to the present invention, a character image generation system of the present invention, for generating an outline font based on character information including a character code and font information and displaying it on a display with a predetermined number of pixels comprises an acquisition unit for obtaining the character information, a character outline information storage unit for storing character outline information corresponding to the character information, a subdivision unit for subdividing a curve expressed by the character outline information, a difference calculation unit for calculating the difference between coordinates at each end of the subdivided curve, a comparison unit for comparing the difference with a predetermined threshold value, and an outline coordinate calculation unit for sequentially calculating coordinates for each of the pixels, based on the result of the comparison and specifying it as the coordinate of the outline of each pixel.

According to the present invention, a storage medium on which is recorded a character image generation program for enabling a computer to execute a process of generating outline font, based on character information including a character code and font information and displaying the outline font on a display with a prescribed number of pixels comprising:

an acquiring process for obtaining the character information;

an subdivision process for obtaining the character information from a character outline information storage unit for storing character outline information corresponding to the character information and subdividing a curve expressed by the character outline information;

a difference calculation process for calculating a difference between coordinates at each end of the subdivided curve;

a comparison process for comparing the difference with a predetermined threshold value; and an outline coordinate calculation process for sequentially calculating coordinates for each pixel, based on a result of the comparison and specifying the coordinates as the coordinates of an outline of each pixel.

According to the present invention, a character image generation method for generating outline font based on character information including a character code and font information and displaying the outline font on a display with a prescribed number of pixels, comprising:

obtaining the character information;

obtaining the character information from a character outline information storage unit for storing character outline information corresponding to the character information and subdividing a curve expressed by the character outline information;

calculating a difference between coordinates at each end of the subdivided curve;

comparing the difference with a predetermined threshold value; and sequentially calculating coordinates for each of the pixels, based on a result of the comparison and specifying the coordinates as the coordinates of an outline of each pixel.

BRIEF DESCRIPTION OF THE DRAWINGS

FIG. 2 shows an example of a character expressed by the functional expression of conventional Bezier curve.

FIG. 6 shows the basic configuration of the character image generation system of the present invention.

FIG. 7 shows an example of the actual configuration of the character image generation system of the present invention.

FIGS. 11A and 11B explain approximating a curve to a straight line in the present invention.

FIG. 18 is the generation flowchart of outline font in the fourth preferred embodiment.

FIG. 21 shows how to calculate an area for determining gradation in the fifth preferred embodiment.

FIG. 29 shows an example of a correspondence table for determining a gradation value in the eighth preferred embodiment (No. 1).

FIG. 30 shows an example of a correspondence table for determining a gradation value in the eighth preferred embodiment (No. 2).

DESCRIPTION OF THE PREFERRED EMBODIMENTS

Figure 1:
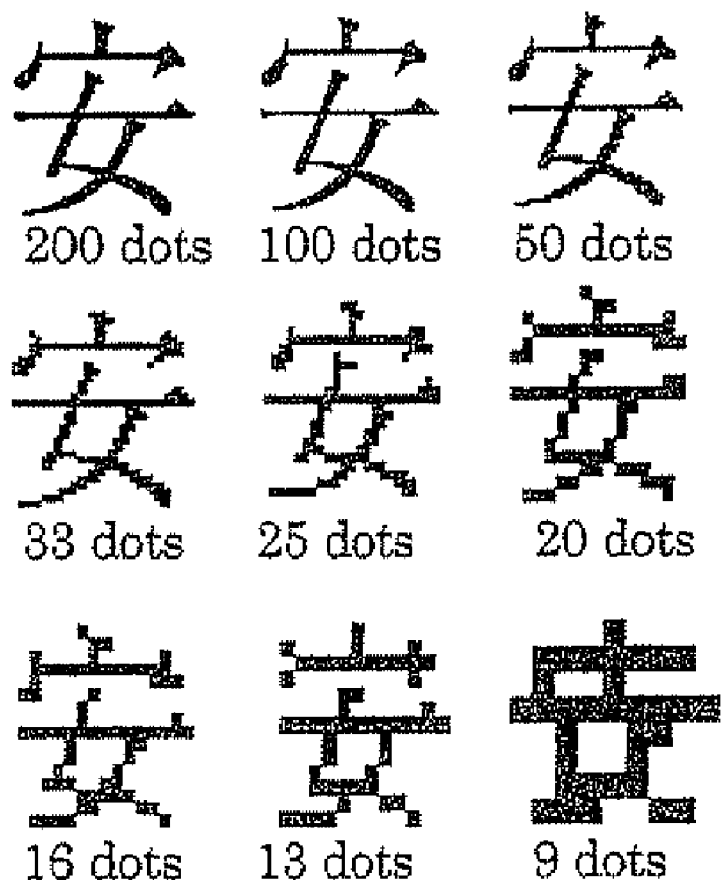
FIG. 1 shows jaggies caused by the change of resolution when using conventional dot font.
Figure 3:
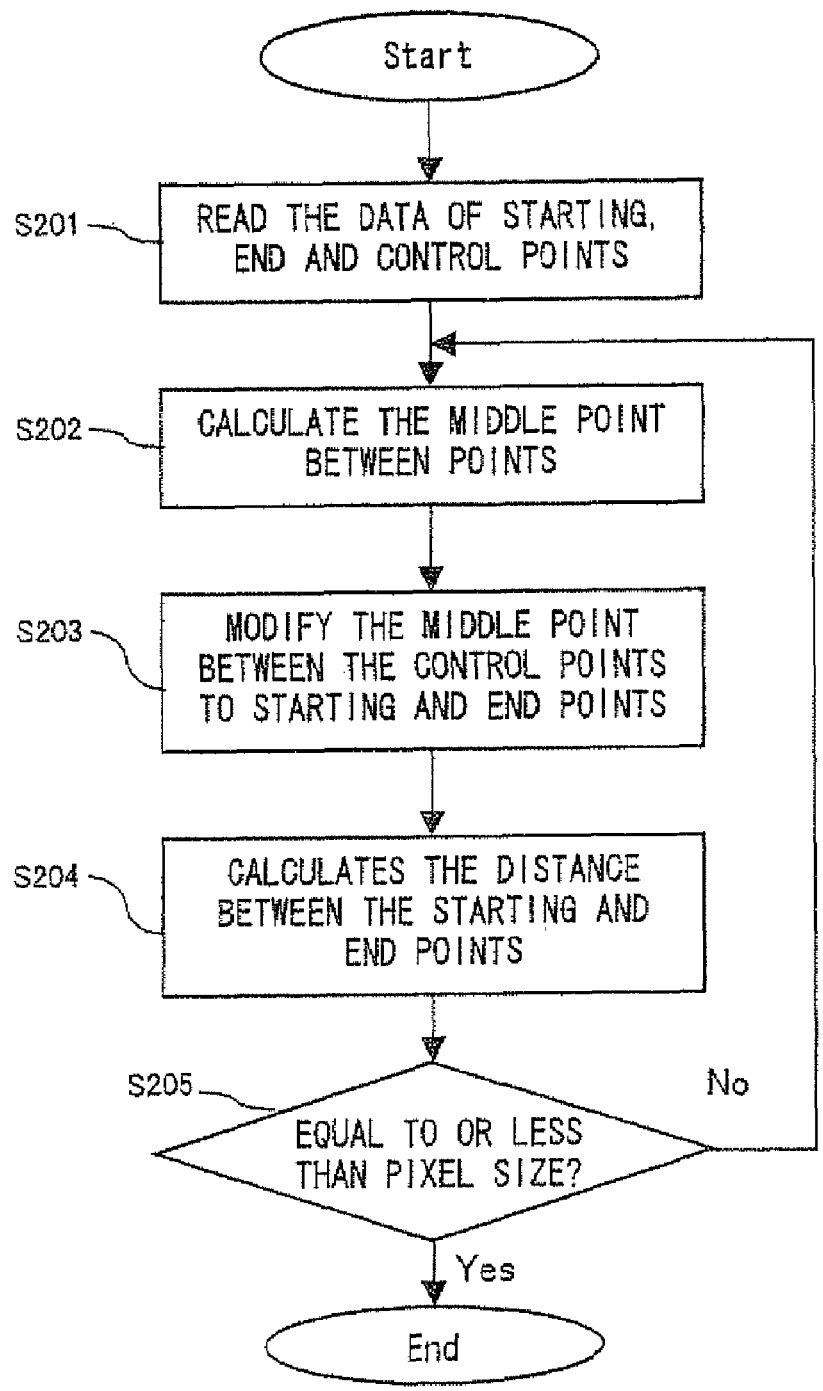
FIG. 3 is an example of the flowchart showing the reproduction process of Bezier curve reproduced by conventional built-in equipment.
Figure 4:
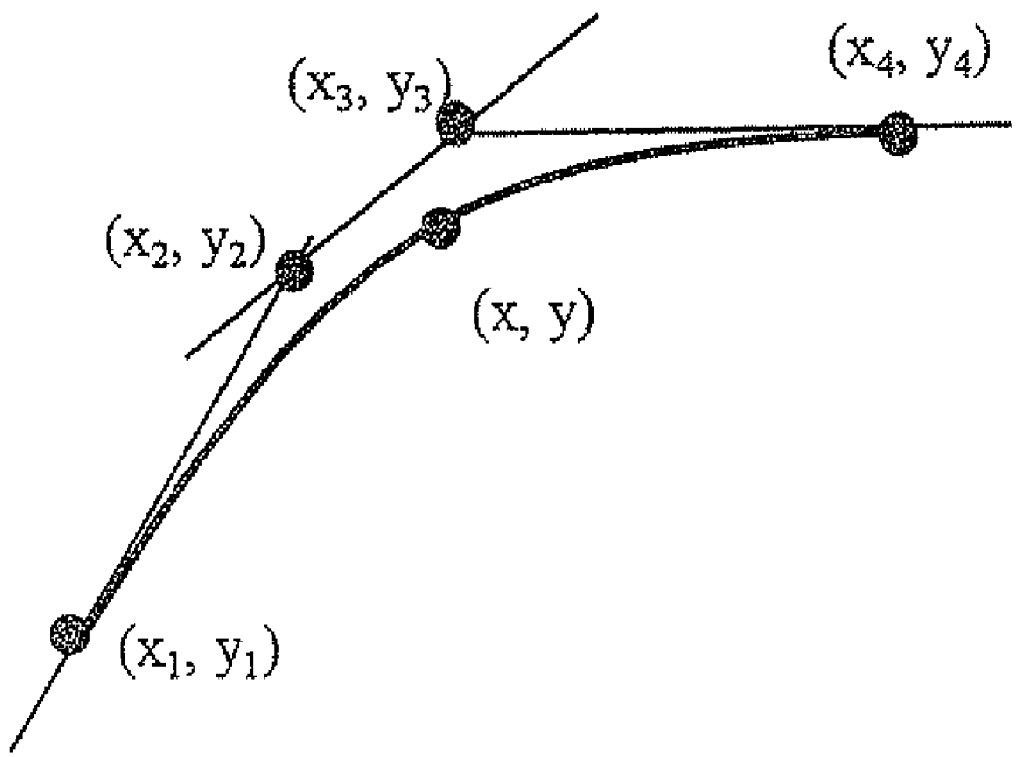
FIG. 4 explains the functional expression of conventional Bezier curve.

FIG. 6 shows the basic configuration of the character image generation system of the present invention. A character image generation system 100 comprises an acquisition unit 101, a subdivision unit 102, a difference calculation unit 103, a comparison unit 104, an outline coordinate calculation unit 105, a character outline gradation setting unit 106, a character outline information storage unit 107, an inclination calculating unit 108 and a correspondence table storage unit 109.

The acquisition unit 101 obtains character information including a character code and font information. The character outline information storage unit 107 stores character outline information (outline data) corresponding to character information.

The subdivision unit 102 reads character outline information corresponding to character information obtained by the acquisition unit 101 from the character outline information storage unit 107 and subdivides a curve expressed by the character outline information. The inclination calculating unit 108 calculates inclination between each end, based on the coordinates at each end of the subdivided curve.

The difference calculation unit 103 calculates the difference between coordinates at each end of the curve subdivided by the subdivision unit 102. The comparison unit 104 compares the difference calculated by the difference calculation unit 103 and a predetermined threshold value (or limit value).

The outline coordinate calculation unit 105 sequentially calculates coordinates for each pixel, based on the comparison result of the comparison unit 104 and specifies it as the coordinates of the outline of each pixel. The character outline gradation setting unit 106 sets the gradation of a pixel constituting the character outline, based on the calculation result of the outline coordinate calculation unit 105.

The correspondence table storage unit 109 stores a table corresponding to a calculated value based an outline obtained by the outline coordinate calculation unit 105. Therefore, the character outline gradation setting unit 106 can also set the gradation of a pixel constituting the character outline using the corresponding to table.

In this way, outline font can be generated.

According to the present invention, the overhead of a character generation process can be reduced by setting a limit value for subdividing a curve, using two orthogonal coordinate information in a character coordinate system and terminating the subdivision process up to the limit value.

According to the present invention, when calculating an outline, outline coordinates can be obtained by incrementing the difference for each pixel size.

According to the present invention, an outline can also be calculated by obtaining inclination, based on the respective coordinates of a starting point and an end point.

According to the present invention, outline coordinates can be obtained using the intersection point of the center line of a pixel and an outline.

According to the present invention outline coordinates can also be obtained using the intersection point of the center line of a pixel and an outline calculated using the inclination against the respective coordinates of a starting point and an end point.

According to the present invention, the gradation value of a character outline can be obtained based on a character coordinate area cut by an outline coordinate position.

According to the present invention, the gradation value of a character outline can also be obtained based on an area cut by an outline straight line and each side of character coordinates.

According to the present invention, the gradation value of a character outline can also be obtained based on the intersection point of an outline straight line, the center line of a pixel and an outline.

According to the present invention, a gradation value can be calculated, based on the proportional allotment between an outline position and the attribute of coordinates.

According to the present invention, a gradation value can also be calculated, using a correspondence table between an outline position and the attribute of coordinates.

According to the present invention, a gradation value can be set according to an LCD characteristic.

According to the present invention, resolution for realizing print quality can be provided by subdividing a character coordinate system more than 64 times a display coordinate system.

FIG. 7 shows an example of the actual configuration of the character image generation system of the present invention. A character image generation system 1 comprises at least an input unit 2, a calculation unit 5, a storage unit 9 and a display unit 14.

The input unit 2 obtains text data and font information. For example, the input unit 2 can be a reading device for reading a document data file 3 for storing text data and font information. Alternatively, the input unit 2 can be a keyboard 4 for inputting text and font information by a key operation or the like. The font information is used when generating a character image (glyph) from font, and contains at least the type of font, font modification data (such as bold, lengthy, etc.) and character size.

The storage unit 9 comprises font memory 10, a limit value setting information storage unit 11, a correspondence table storage unit 12, image memory 13 and the like. The font memory 10 stores character font (character generation data). The image memory 13 temporarily stores a character image generated by the calculation unit 5 or a character image composed of a plurality of characters.

The storage unit 9 stores limit value setting information. The limit value of the difference of each coordinate when subdividing is set as the limit value. The limit value is at lowest one pixel. The correspondence table storage unit 12 stores a correspondence table for storing gradation values corresponding to the area ratio of an outline in one pixel. Furthermore, the storage unit 9 stores the program of the present invention. The storage unit 9 also stores a character coordinate system obtained by subdividing the display coordinate system of a display. In other words, it handles the coordinate system obtained by subdividing one pixel of the display as character coordinates.

The font memory 10, limit value setting information storage unit 11, correspondence table storage unit 12 and image memory 13 can exist in one storage unit or a plurality of storage units.

The calculation unit 5 at least reads outline data, selects an outline generation method, generates a character outline and generates a character image. The calculation unit 5 comprises an outline data reading unit 6, a character outline generation unit 7 and a character image generation unit 8. Firstly, the calculation unit 5 converts text data inputted by the input unit 2 into a character code.

Then, the calculation unit 5 calls up character generation data (outline data) corresponding to an inputted text from the font memory 10, based on a character code and font information. In the case of Bezier curve, the outline data is, for example, a parameter, such as a starting point, an end point and a control point or the like.

Then, in the calculation unit 5 that obtains the outline data, the outline data reading unit 6 reads the obtained outline data. Then, the character outline generation unit 7 generates a character outline, based on the read outline data and performs a gradation process. Then, the character image generation unit 8 writes the outline (character outline) generated by the character outline generation unit 7 in the image memory 13 and paints out the inside of the outline.

The display unit 14 displays the generated character image. Specifically, the character image written in the image memory 13 is displayed on the display unit 14. If the display unit 14 is mounted on portable equipment, in many cases, an LCD panel is used for the reason that it must be light.

Figure 8:
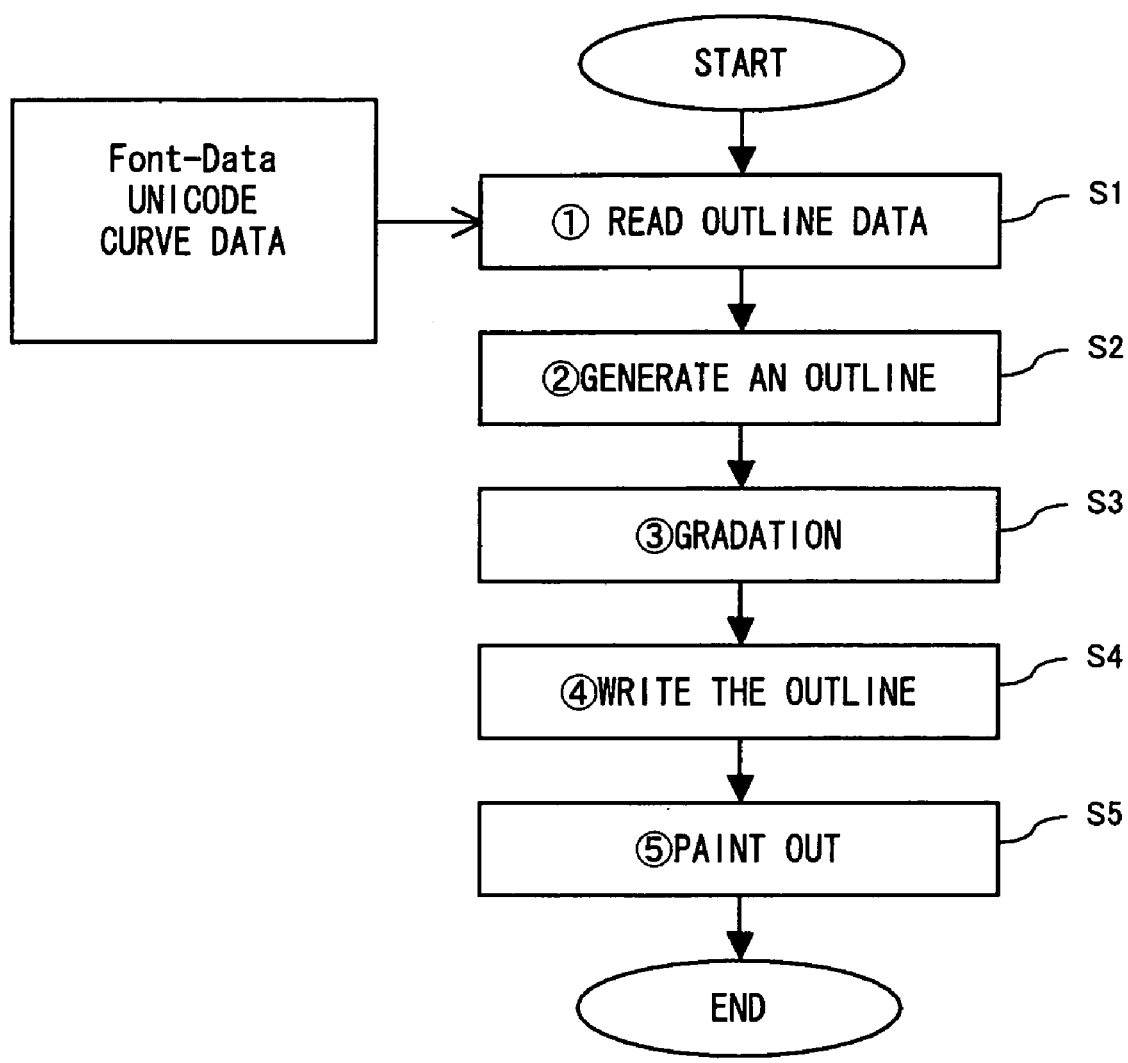
FIG. 8 is a flowchart showing the character image generation process of outline font.

FIG. 8 is a flowchart showing the character image generation process of outline font. In the character image generation system 1, firstly, as described above, the calculation unit 5 obtains curve data from the font memory 10, based on font data and UNICODE inputted by the input unit 2. Then, the outline data reading unit 6 reads the outline data (S1).

Then, the character outline generation unit 7 generates an outline, based on the outline data (S2). Thus, a character outline is reproduced in a character coordinate system. In the case of Bezier curve, the character coordinate system is, for example, one expressed by the above-mentioned equations (1) through (3).

Then, the character outline generation unit 7 applies a gradation process to the outline (S3). The gradation process is applied with an anti-aliasing measure. In other words, in order to display a character highly precisely, a method for gradating the outline of each pixel as shown in FIGS. 11A and 11B is popular.

Then, the character image generation unit 8 writes the gradated outline in the image memory 13 (S4). Furthermore, the character image generation unit 8 paints out the inside of a closed curve whose outline is generated by the outline (S5).

There is also a method for storing a character center line as data and generating a character image by thickening this center line (stroke font).

Figure 9:
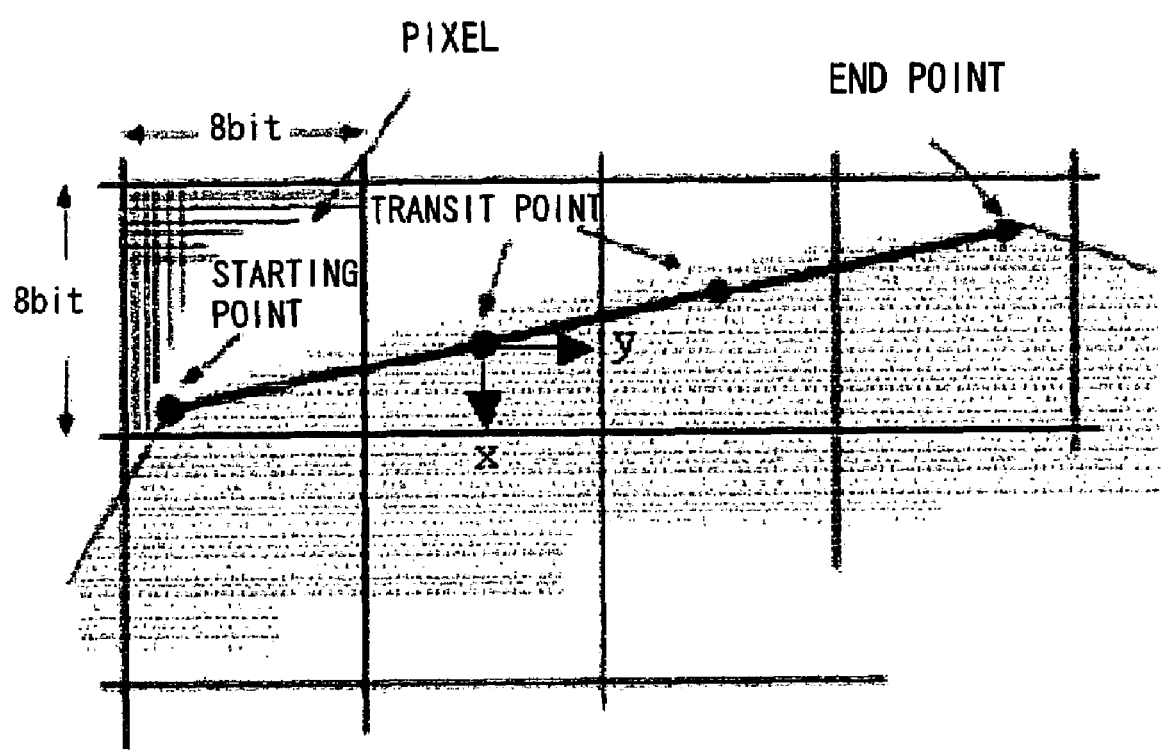
FIG. 9 explains the gradation of an outline.

FIG. 9 explains the gradation of an outline in S3 of FIG. 8. A gradation value at the position is determined according to the area from which a pixel is cut, based on the location coordinates of the point where the subdivision is suspended. In FIG. 9, the coordinates (x, y) on the outline of each pixel are calculated, and a gradation value is set, based on the area ratio of the portion cut by the outline, of each pixel.

In the present invention, when subdividing an outline, a subdivision limit value is set in the difference ($\Delta x$, $\Delta y$) between a starting point and an end point. If either a difference in the X axis direction $\Delta x$ or a difference in the Y axis direction $\Delta y$ drops below the limited value, the subdivision process terminates. In this way, process time needed to subdivide is shortened.

Furthermore, in the present invention, when calculating the outline coordinates of the divided curve, the outline coordinates can be calculated by incrementing the coordinates starting from the starting point for each pixel size in the direction orthogonal to the axis direction of a difference that is less than the limit value, based on difference information between subdivided starting and end points.

In the present invention, a character image is expressed by a character coordinate system obtained by dividing at least one pixel by 64×64 in order to preserve a character design. In the present invention outline coordinates are calculated using this character coordinate system. In the present invention, after calculating the outline coordinates, the gradation value of the pixel is calculated. The gradation value is set using the ratio between the outline coordinates and pixel.

Thus, when subdividing a character, the present invention can improve speed by omitting distance calculation.

The size of a display panel mounted on portable equipment is almost constant for the reason of a portability requirement. Size easy to read (about 3.5 mm) is used for characters to be displayed on such a display panel, and the modification of used size is also restricted to a specific range around it.

Therefore, if LCD resolution information is known, the number of strokes constituting a character used in portable equipment is uniquely determined. For example, a character of size 3 mm-4 mm is used on a display panel of 200 ppi, a character image is composed of 24 through 36 dots (pixels).

The longest line element constituting the outline of a character (in terms of a Bezier curve, one unit indicated by a curve between starting and end points) is also about 90% of the number of pixels. If a line element is subdivided, the length of a line element is further shortened.

If in the case of a line element composed of several or less pixels, an approximate curve, such as a Bezier curve is used, the change in curvature of a line element is almost the same as that of a straight line even when control point coordinates are a maximum in the character coordinate system. In this case, a curve can be approximately handled as a straight line using a human eye characteristic that change of several dots or less cannot be recognized on a display panel (see FIG. 10) (see Kathryn T. Spoehr and Stephen W. Lehmkuhle, "Information Processing of Visual Angle-Software for Seeing" translated by Naoyuki Imosaka et al., Science Corporation (1986)).

Figure 10:
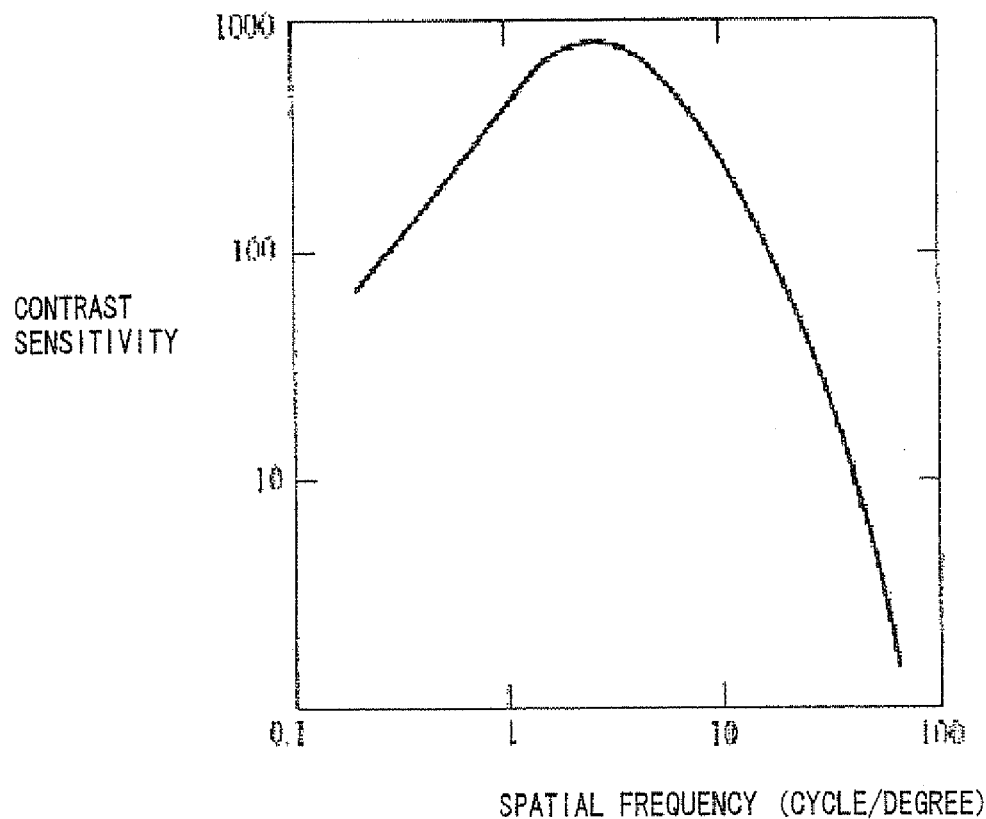
FIG. 10 is the graph of the resolution of human eyes.

FIG. 10 is the graph of the resolution of human eyes. In FIG. 10, horizontal and vertical axes represent spatial frequency (cycle/degree) and contrast sensitivity, respectively. If image data is considered to be the distribution of color (density, luminance, etc.), the distribution can be taken as a wave. For example, the distribution can be considered to be a pattern (wave) with alternatively repeated light and darkness, and the repetition can be considered to be a frequency. In this case, this frequency is called a "spatial frequency". If this spatial frequency is low, the width of a pattern of light and darkness is wide. Conversely, if the spatial frequency is high, the width of a pattern of light and darkness is narrow.

As shown in FIG. 10, the contrast reaches a peak when the spatial frequency is about 5 cycle/degree and decreases after that. Weak contrast means that light and darkness is difficult to distinguish. Specifically, human eyes become more difficult to perceive in the higher spatial frequency side.

Therefore, as described above, by utilizing a human eye characteristic that the change of several dots or less cannot be recognized on a display panel, a curve can be approximately handled as a straight line. In other words, if the difference in coordinates between the starting and end points of a line element is calculated, the curve of a predetermined difference size between starting and endpoints can be approximated to a straight line.

Therefore, in the present invention, a curve is approximated to a straight line utilizing the human eye characteristic that the change of several dots or less cannot be recognized on a display panel. This is described below with reference to FIGS. 11A and 11B.

Figure 5:
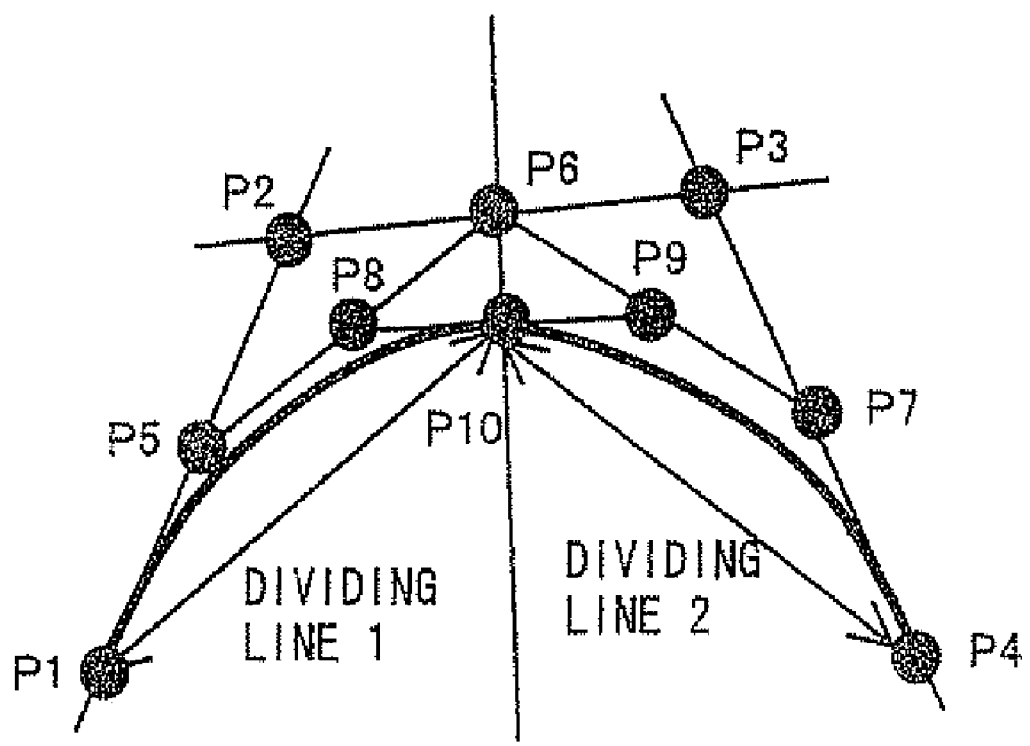
FIG. 5 explains the subdivision method of conventional Bezier curve.

FIGS. 11A and 11B explain approximating a curve to a straight line in the present invention. FIG. 11A shows, for example, an enlarged Bezier curve on the way of subdivision. As described with reference to FIG. 5, a Bezier curve continues to be subdivided endlessly. However, even if a curve of several dots or less is reproduced on a display panel, attribute to human eye characteristic as described with reference to FIG. 10, the curve cannot be distinguished from a straight line approximated to the curve. Therefore, the curve shown in FIG. 11A can be expressed as a straight line as shown in FIG. 11B. By doing so, the overhead of curve approximating calculation can be avoided, thereby realizing the reduction of processing time.

The preferred embodiments of the present invention are described below. Although the present invention is described below using the subdivision method of a Bezier curve as an example, the method is not limited to this, and another outline generation method is also applicable.

The First Preferred Embodiment

In this preferred embodiment, using the information of XY coordinate system, being two orthogonal coordinate systems in a character coordinate system, a limit value for subdividing curve is set and a subdivision process is terminated.

Figure 12:
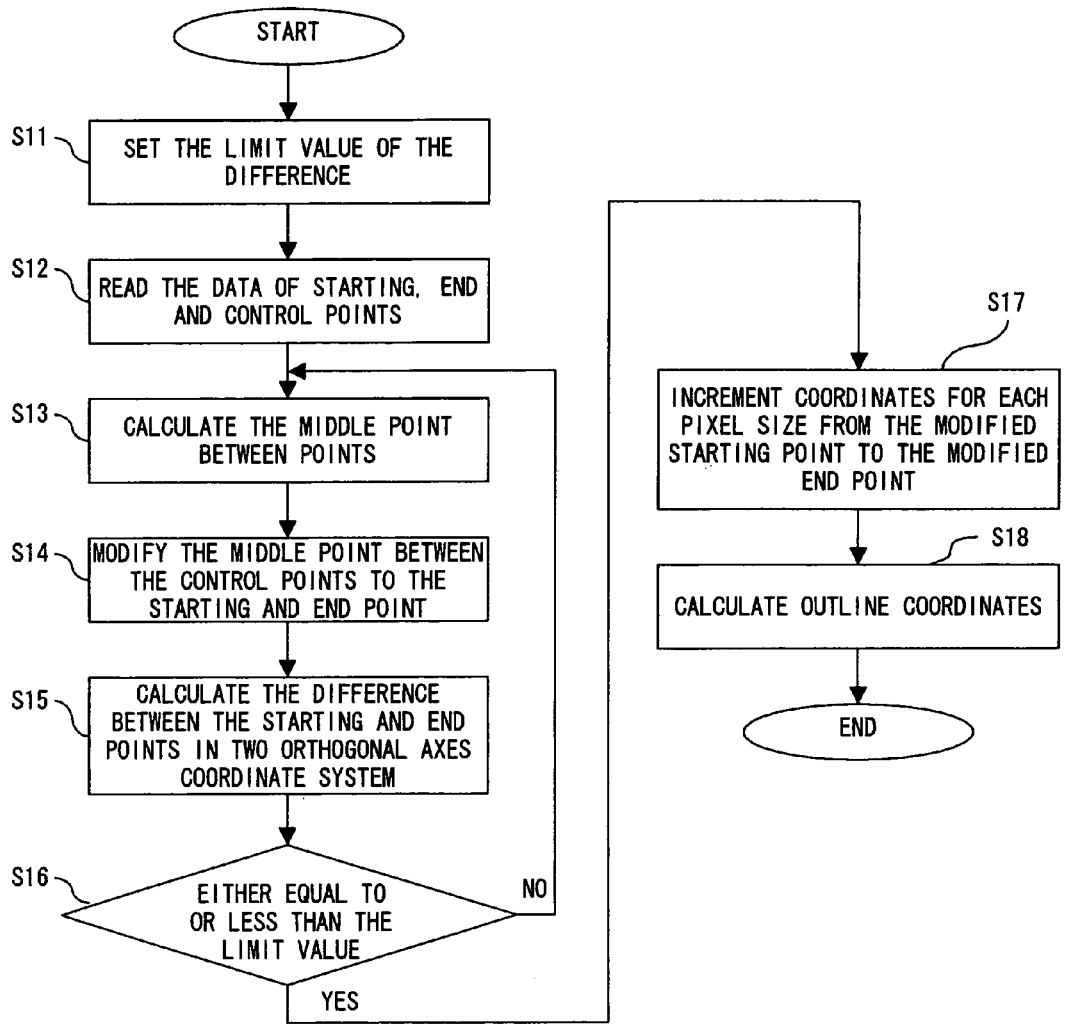
FIG. 12 is the generation flowchart of outline font in the first preferred embodiment.

FIG. 12 is the generation flowchart of outline font in the first preferred embodiment. This flow is executed by the character outline generation unit 7. Firstly, the limit value of the difference between starting and end points for terminating subdivision is set (S11). The difference between starting and end points is described with reference to FIG. 13.

Figure 13:
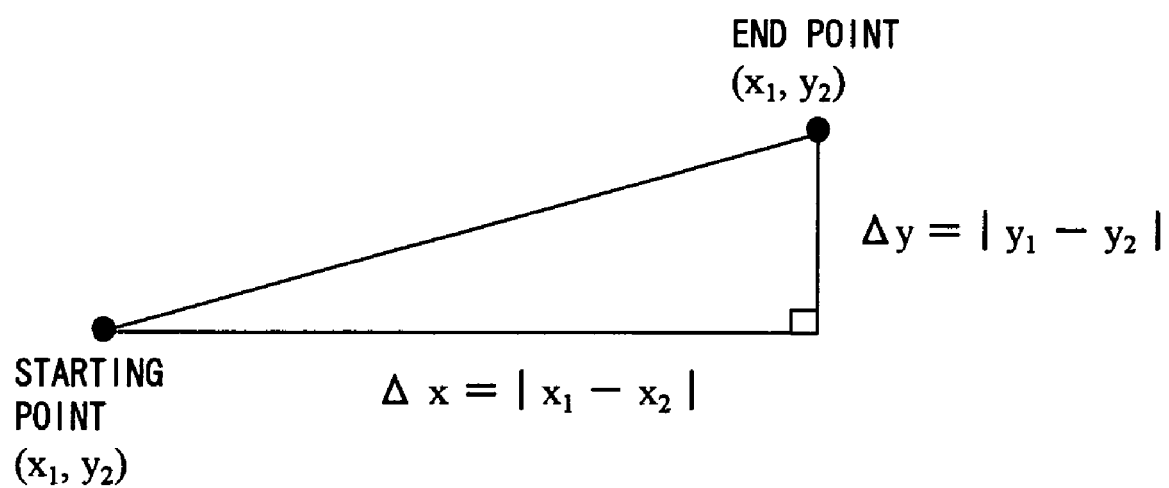
FIG. 13 shows the differences $\Delta x$ and $\Delta y$ between a starting point and an end point in the first preferred embodiment.

FIG. 13 shows the differences $\Delta x$ and $\Delta y$ between starting and end points in this preferred embodiment. It is assumed that starting and end points are $(x_1, y_1)$ and $(x_2, y_2)$, respectively. In this case, as to the X coordinate, a difference $\Delta x = |x_1 - x_2|$ is obtained. As for the Y coordinate, a difference $\Delta y = |y_1 - y_2|$ is obtained. Hereinafter, $\Delta x$ and $\Delta y$ are called the differences between starting and end points. Now, we are back to the description of FIG. 12.

Although in S11, the limit value of the differences $\Delta x$ and $\Delta y$ between starting and end points are set, this limit value indicates the number of pixels needed to accommodate $\Delta x$ or $\Delta y$. For example, the curve shown in FIG. 11A is accommodated by vertical six pixels and horizontal two pixels.

This limit value is determined by the resolution of human eyes and resolution of a display. According to FIG. 10, for example, contrast is 10 or less at 80 cycle/degree, and is difficult to be detected by human eyes. It is assumed that this case is set as a limit value. If the resolution of a display and an observation distance are r ppi (pixel per inch) and L cm, respectively, limit value u is calculated as follows.

$$U = L \times \tan(1/(80 \times 2))/(25.4/r)$$

For example, if L=0.5 cm and r=1500 ppi, U=3.17. Therefore, if is passable if 3 or less is set as limit value u.

Then, the data of the starting, end and control points of one line element constituting an outline is read from font data (S12). Then, as described with reference to FIG. 5, each of the middle point coordinates between the starting and control points, control points, and control and end points is calculated (S13). Then, as described with reference to FIG. 5, each middle point is modified to starting and end points in order to subdivide the line element (S14).

Then, the differences $\Delta x$ and $\Delta y$ between two orthogonal axes between the starting and end points of the subdivided line element are calculated (S15). Then, the calculated difference values $\Delta x$ and $\Delta y$ are compared with the limit value u set in S21 (S16). If as the result of the comparison in S16, either $\Delta x$ or $\Delta y$ drops below the limit value u, (in S16 the process proceeds to "Yes") the subdivision suspends.

If $\Delta x$ and $\Delta y$ are both exceed the limit value u, (in S16 the process proceeds to "No"), each of the middle point coordinates between the starting and control points, control points, and control and end points is further calculated. By modifying each of the coordinates to a middle point, the line element is further subdivided (S13 through S15 are repeated).

If the subdivision suspends, as to an axis direction where the differences do not drop below the limit value, in S17 and S18 coordinates between the starting and end points are incremented for each pixel size, and its outline coordinates are calculated. Firstly, as to an axis direction where the differences do not drop below the limit value, the coordinates between the modified starting and end modified points are incremented for each pixel size (S17). For example, in this case, it is assumed that the starting and end points are $(x_1, y_1)$ and $(x_2, y_2)$, respectively. If the coordinates in the X axis direction are incremented for each pixel size when $\Delta y$ drops below the limit value (in this case, $\Delta x$ does not drop below the limit value), the coordinates become $x_1+1$, $x_1+2$, $x_1+3, \ldots, x_1+n$ ($n \leq x2$). In this way, outline coordinates continue to be determined in the character coordinate system (S18). S17 and S18 are applied to each subdivided section (between the starting and end points).

Figure 14:
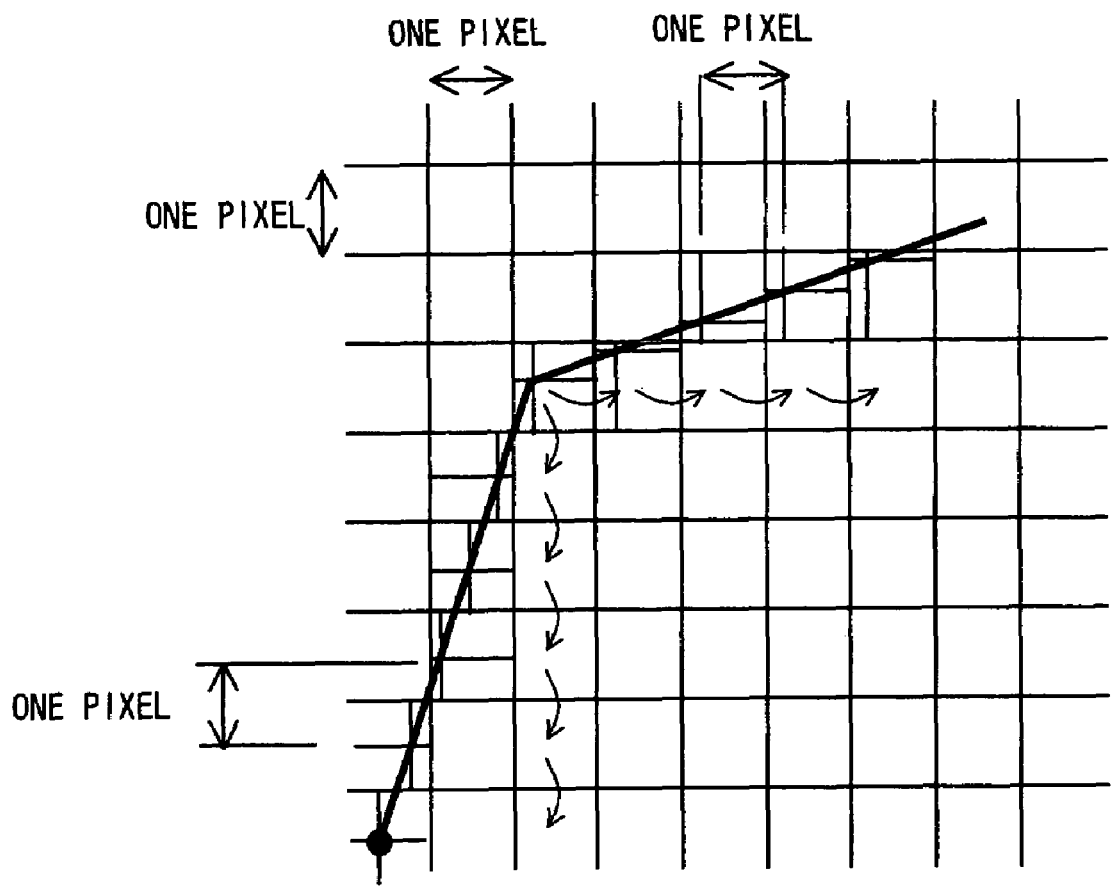
FIG. 14 shows each enlarged line element of outline font in the first preferred embodiment.

FIG. 14 shows each enlarged line element of outline font in this preferred embodiment. In FIG. 14, the position of each of the outline coordinates at the time of completion of the subdivision is indicated by the intersection of a cross.

Although in this preferred embodiment, as to an axis direction where the differences do not drop below the limit value, the differences are incremented from the starting point toward the end point, as a result, deviation occurs in the position of each end point. For example, if coordinates are incremented in the X direction from the starting point, they become $(x_1+1, y_1), (x_1+2, y_1), (x_1+3, y_1), \ldots, (x_2, y_1)$. Then, there are two end points $(x_2, y_1)$ and $(x_2, y_2)$, a difference $y_2-y_1$ occurs. In this case, it is OK if the limit value is set in such away that $y_2-y_1$ can be within one pixel.

Thus, by using information about two orthogonal coordinates in the character coordinate system, a limit value for subdividing a curve can be set and the subdivision process can be terminated at the limit value. Since the number of subdivision processes can be restricted in this way, display speed can be improved, thereby reducing the overhead of a character generation process.

Furthermore, since coordinates are incremented and calculated for each pixel size only one direction, processing speed can also be improved.

The Second Preferred Embodiment

Although in the first preferred embodiment, in either coordinate direction of the XY coordinate system, the differences between starting and end points are incremented for each pixel size and outline coordinates are calculated, in this preferred embodiment, outline coordinates are calculated by calculating inclination in coordinates between starting and end points. Parts especially not referred are the same as in the first preferred embodiment.

Figure 15:
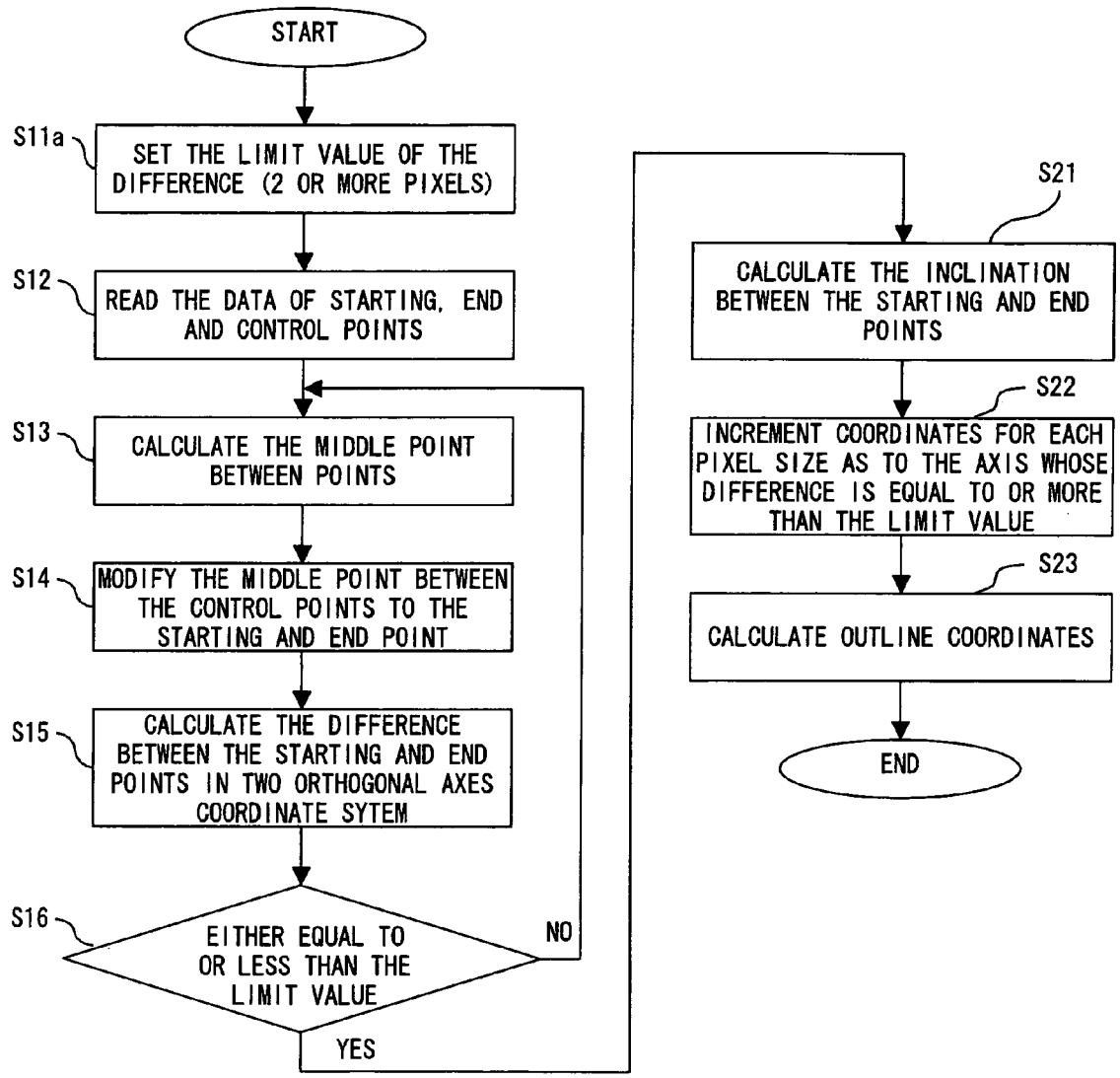
FIG. 15 is the generation flowchart of outline font in the second preferred embodiment.

FIG. 15 is the generation flowchart of outline font in this preferred embodiment. The character outline generation unit 7 executes this flow. Firstly, the limit value u of the difference between starting and end points for terminating subdivision is set to 2 or more (S11a). S11a is OK if in S11 of FIG. 12 the limit value u is set to 2 or more.

Then, as in the first preferred embodiment, the data of the starting, end and control points of one line element constituting an outline is read from font data (S12). Then, each of the middle point coordinates between the starting and control points, control points, and control and end points is calculated (S13). Then, each middle point is modified to starting and end points in order to subdivide the line element (S14).

Then, the differences $\Delta x$ and $\Delta y$ between two orthogonal axes between the starting and end points of the subdivided line element are calculated (S15). Then, the calculated difference values $\Delta x$ and $\Delta y$ are compared with the limit value u set in S21 (S16). If as the result of the comparison in S16, either $\Delta x$ or $\Delta y$ drops below the limit value u, (in S16 the process proceeds to "Yes") the subdivision suspends.

If $\Delta x$ and $\Delta y$ are both exceed the limit value u, (in S16 the process proceeds to "No"), each of the middle point coordinates between the starting and control points, control points, and control and end points is further calculated. By modifying each of the coordinates to a middle point, the line element is further subdivided (S13 through S15 are repeated).

If the subdivision suspends, as to an axis direction where the differences do not drop below the limit value, in S21 through S23, outline coordinates are calculated. Firstly, inclination $\Delta y/\Delta x$ between starting and end points is calculated (S21). Then, as to an axis direction where the differences do not drop below the limit value, coordinates are incremented for each pixel size between modified starting and end points (S22). Then, regarding an outline line as a straight line with the inclination, outline coordinates continue to be determined in the character coordinate system (S23).

For example, in this case, it is assumed that the starting and end points are $(x_1, y_1)$ and $(x_2, y_2)$, respectively. If the coordinates in the X axis direction are incremented for each pixel size when $\Delta y$ drops below the limit value (in this case, $\Delta x$ does not drop below the limit value), the coordinates become $x_1+1, x_1+2, x_1+3, \ldots, x_1+n$ ($n<x_2$). In this case, the inclination is obtained, Y coordinate corresponding each X coordinate is obtained. S21 through S23 is applied to each subdivided section (between staring and end points).

Thus, two-dimensional coordinates are calculated by calculating inclination using the respective coordinates of starting and end points and incrementing coordinates for each pixel size only in one direction when calculating outline coordinates. Since the coordinates of a point obtained by incrementing for prescribed pixels and the coordinates of the essential end point coincide, a large value can be set to the limit value.

The Third Preferred Embodiment

In this preferred embodiment, a point obtained by incrementing coordinates for each pixel size in either of the coordinate system directions of the XY coordinate system and plotted is the coordinates of the center of each pixel. Parts especially not referred are the same as in the first and second preferred embodiments.

Figure 16:
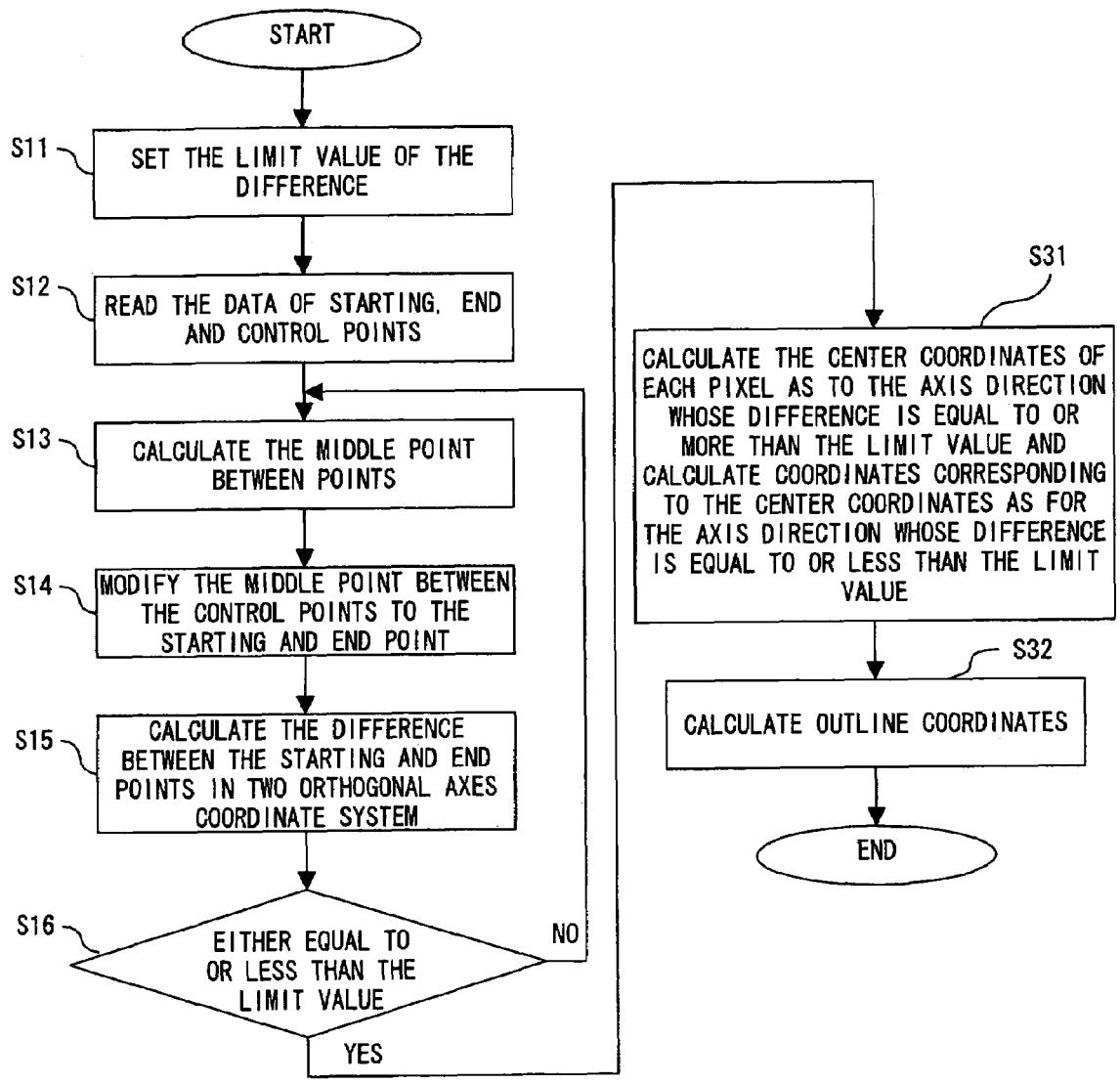
FIG. 16 is the generation flowchart of outline font in the third preferred embodiment.

FIG. 16 is the generation flowchart outline font in this preferred embodiment. The character outline generation unit 7 also executes this flow. As in the first preferred embodiment, the limit value of the difference between starting and end points for terminating subdivision is set (S11). Then, as in the first preferred embodiment, the data of starting, end and control points of one line element constituting an outline is read from font data (S12). Each of the middle point coordinates between the starting and control points, control points, and control and end points is calculated (S13). Each middle point is modified to starting and end points in order to subdivide the line element (14).

Then, the differences $\Delta x$ and $\Delta y$ of two orthogonal axes between the starting and end points of the subdivided line element are calculated (S15). Then, the calculated differences $\Delta x$ and $\Delta y$ are compared with the limit value set in S11a. If as a result of the comparison in S15, either $\Delta x$ or $\Delta y$ drops below the limit value u, the subdivision suspends.

If $\Delta x$ and $\Delta y$ are both exceed the limit value u, (in S16 the process proceeds to "No"), each of the middle point coordinates between the starting and control points, control points, and control and end points is further calculated. By modifying each of the coordinates to a middle point, the line element is further subdivided (S13 through S15 are repeated).

If the subdivision suspends, as to an axis direction where the differences do not drop below the limit value, in S31 and S32 outline coordinates are calculated. In this preferred embodiment, by calculating the coordinates at the center of each pixel between starting and end points as to an axis direction where the differences exceeds the limit value and calculating coordinates corresponding to the coordinates at the center as to an axis direction where the differences exceeds the limit value (S31), outline coordinates are calculated (S32). This is described with reference to FIG. 17. S31 and S32 are applied to each subdivided section (between the starting and end points).

Figure 17:
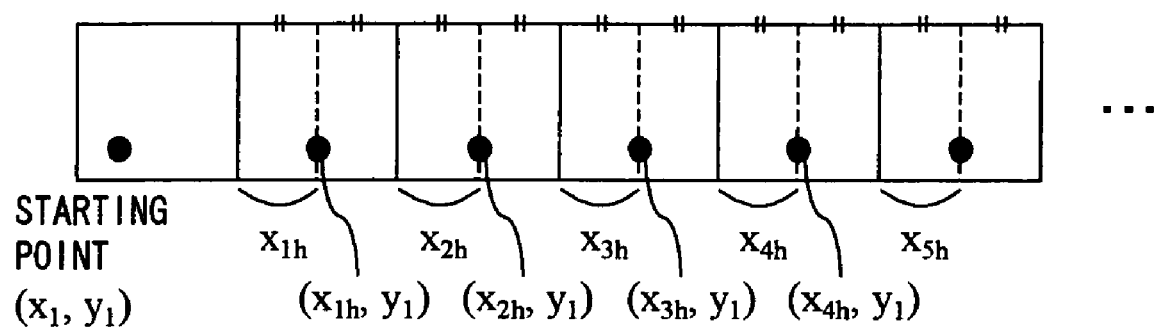
FIG. 17 shows how to obtain the outline coordinates in the third preferred embodiment.

FIG. 17 shows how to obtain the outline coordinates in this preferred embodiment. In this preferred embodiment, as to an axis direction where the differences do not drop below the limit value, coordinates are incremented for each pixel size between the starting and end points. In this case, the center coordinates of each pixel (in this case, center coordinates in the increment direction) are calculated.

For example, if starting and end points are $(x_1, y_1)$ and $(x_2, y_2)$, respectively, outline coordinates in the X axis direction are obtained when $\Delta y$ drops below the limit value (in this case, $\Delta x$ does not drop below the limit value). In this case, the center coordinates $x_{1h}, x_{2h}, x_{3h}, x_{4h}, x_{5h}, \ldots, x_{nh}$ ($x_{nh} < x_2$) in the X coordinate of each pixel consecutive from a pixel adjacent to a pixel to which a starting point belongs are obtained. In this case, it is assumed that the Y coordinate corresponding to each X coordinate is the Y coordinate $y_1$ of the starting point. This process is applied by incrementing coordinates for each pixel size between the starting and end points. In this case, at the Y coordinate of the end point, a difference $y_2 - y_1$ occurs. In this case, it is OK if the limit value is set in such a way that $y_2 - y_1$ can be within one pixel.

Since the number of the subdivision processes can be restricted thus, display speed ca be improved, thereby reducing the overhead of the character generation process.

Furthermore, since coordinates are incremented and calculated for each pixel size only one direction, processing speed can also be improved.

The Fourth Preferred Embodiment

This preferred embodiment can be obtained by combining the second and third preferred embodiments.

FIG. 18 is the generation flowchart of outline font in this preferred embodiment. The character outline generation unit 7 also executes this flow. Firstly, the limit value u of the difference between starting and end points for terminating subdivision is set to 2 or more (S11a). S11a is OK if in S11 of FIG. 12 the limit value u is set to 2 or more.

Then, as in the first preferred embodiment, the data of the starting, end and control points of one line element constituting an outline is read from font data (S12). Then, each of the middle point coordinates between the starting and control points, control points, and control and end points is calculated (S13). Then, each middle point is modified to starting and end points in order to subdivide the line element (S14).

Then, the differences $\Delta x$ and $\Delta y$ between two orthogonal axes between the starting and end points of the subdivided line element are calculated (S15). Then, the calculated difference values $\Delta x$ and $\Delta y$ are compared with the limit value u set in S11a. If as the result of the comparison in S15, either $\Delta x$ or $\Delta y$ drops below the limit value u, (in S16 the process proceeds to "Yes") the subdivision suspends.

If $\Delta x$ and $\Delta y$ are both exceed the limit value u, (in S16 the process proceeds to "No"), each of the middle point coordinates between the starting and control points, control points, and control and end points is further calculated. By modifying each of the coordinates to a middle point, the line element is further subdivided (S13 through S15 are repeated).

If the subdivision suspends, as to an axis direction where the differences do not drop below the limit value, outline coordinates are calculated in S21, S41 and S42. S21a, S41 and S42 are applied to each subdivided section (between the starting and end points) S21a process includes S21 and S31. These processes are described in detail below.

Firstly, inclination $\Delta y / \Delta x$ between starting and end points is calculated (S21a (that is, a part of process corresponding to S21)). Then, as in the third preferred embodiment, the coordinates of the center of each pixel between the starting and end points is calculated as to an axis direction where the differences exceed the limit value (S21a (that is, a part of process corresponding to S31)). As to an axis where the differences drop below the limit value, coordinates corresponding to the center coordinates are calculated using the inclination $\Delta y / \Delta x$ (S41). In this way, outline coordinates are calculated (S42).

Figure 19:
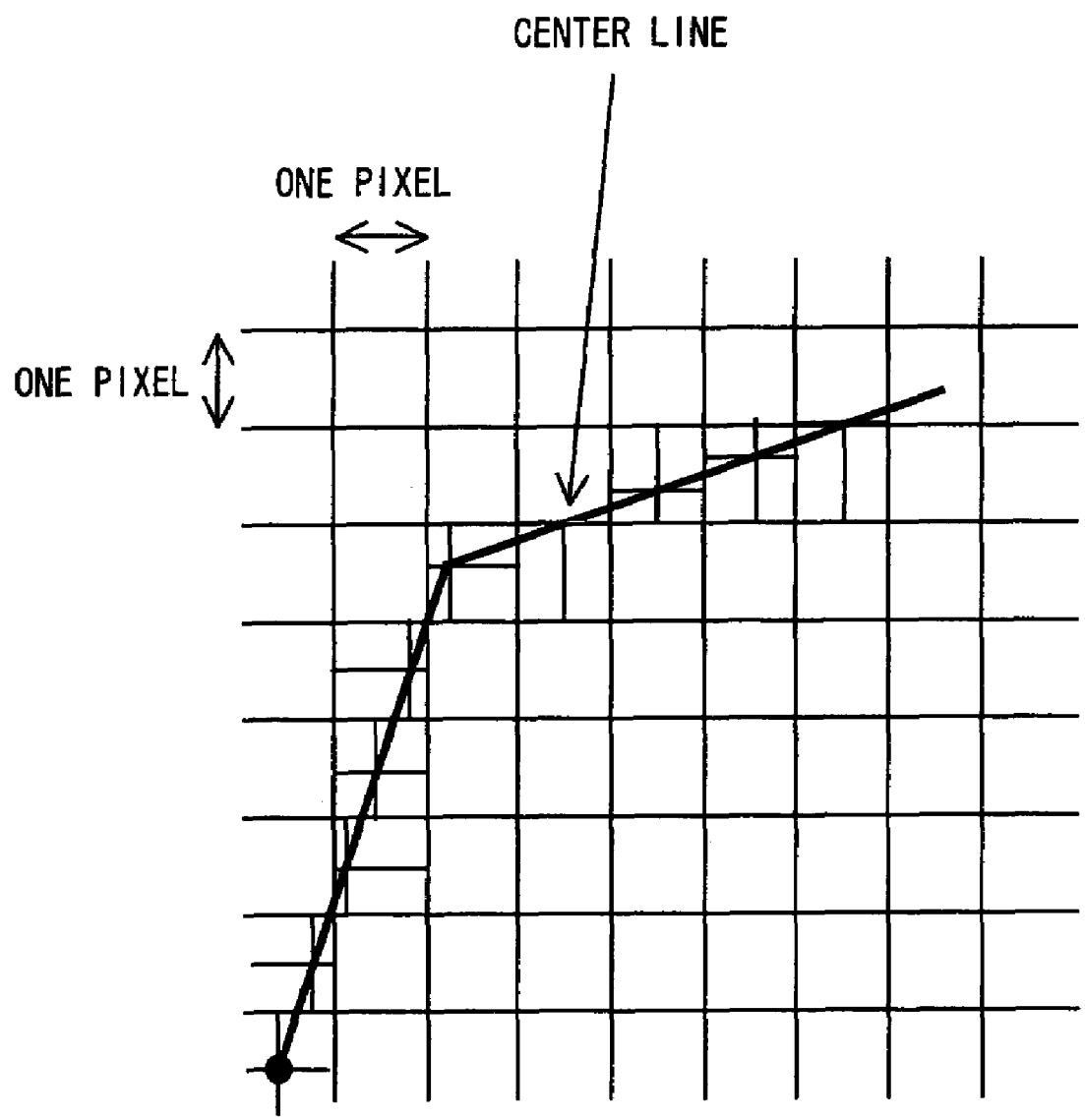
FIG. 19 shows each enlarged line element of outline font obtained in the fourth preferred embodiment.

FIG. 19 shows each enlarged line element of outline font obtained in this preferred embodiment. FIG. 19 shows the position of the outline coordinates at the time of the completion of the subdivision by the intersection of a cross. In each character pixel, the intersection between an outline and a center line is outline coordinates.

Thus, as in the second preferred embodiment, the accuracy of outline reproduction can be improved and also display speed can be improved, thereby reducing the overhead of the character generation process.

The Fifth Preferred Embodiment

In this preferred embodiment, a gradation value at a character outline is determined using the outline coordinates calculated in the first preferred embodiment.

Figure 20:
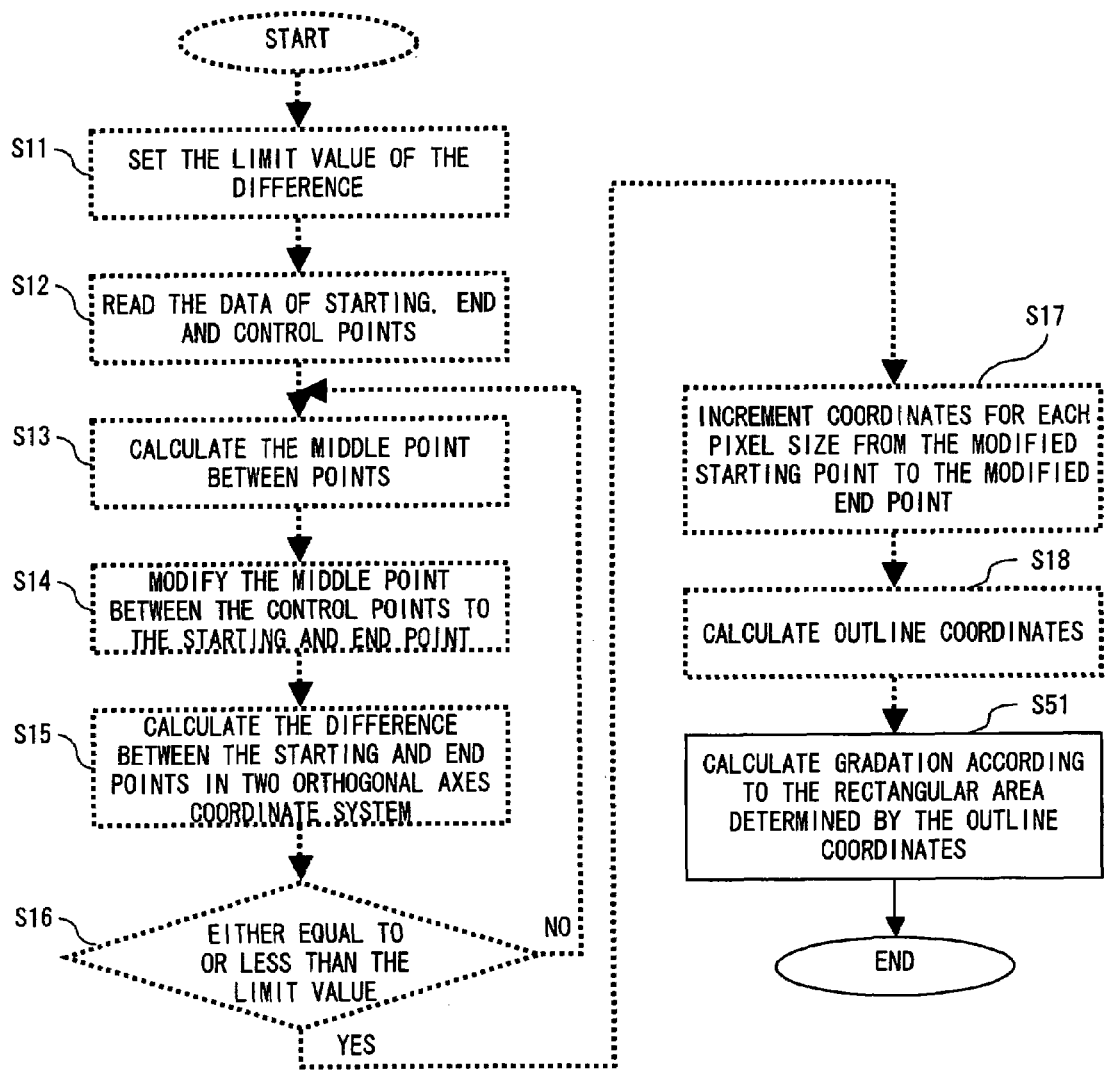
FIG. 20 is a flowchart showing the process of generating outline font and setting gradation in an outline in the fifth preferred embodiment.

FIG. 20 is a flowchart showing the process of generating outline font and setting gradation in an outline in this preferred embodiment. The character outline generation unit 7 executes this flow. In FIG. 20, outline coordinates are obtained by implementing the first preferred embodiment (S11-S18 in FIG. 12). Then, gradation is calculated according to a rectangular area determined by the outline coordinates (S51). The process in S51 is described with reference to FIG. 21.

FIG. 21 shows how to calculate an area for determining gradation in this preferred embodiment. In FIG. 21, the area distribution of all pixels is calculated using a ratio up to the intersection position between the outline and the center line of a pixel and is specified as a gradation value.

In FIG. 21A, assuming the center coordinates in the X coordinate of one pixel to be $x_{1h}$, the Y coordinate $y_1$ on the outline, corresponding to $x_{1h}$ is calculated. Then, the area of a rectangular portion (=length of one side of one pixel×$y_1$) is calculated. In this case, as shown in FIG. 21B, the area ratio of the rectangular portion to one pixel becomes (area of a rectangular area)/(area of one pixel). Therefore, a gradation value can be calculated as follows.

Gradation value=entire gradation value×(area of a rectangular portion)/(area of one pixel)

For example, if area distribution is 0.5 against one pixel, a gradation value is 128 against the entire gradation values of 255.

Figure 22:
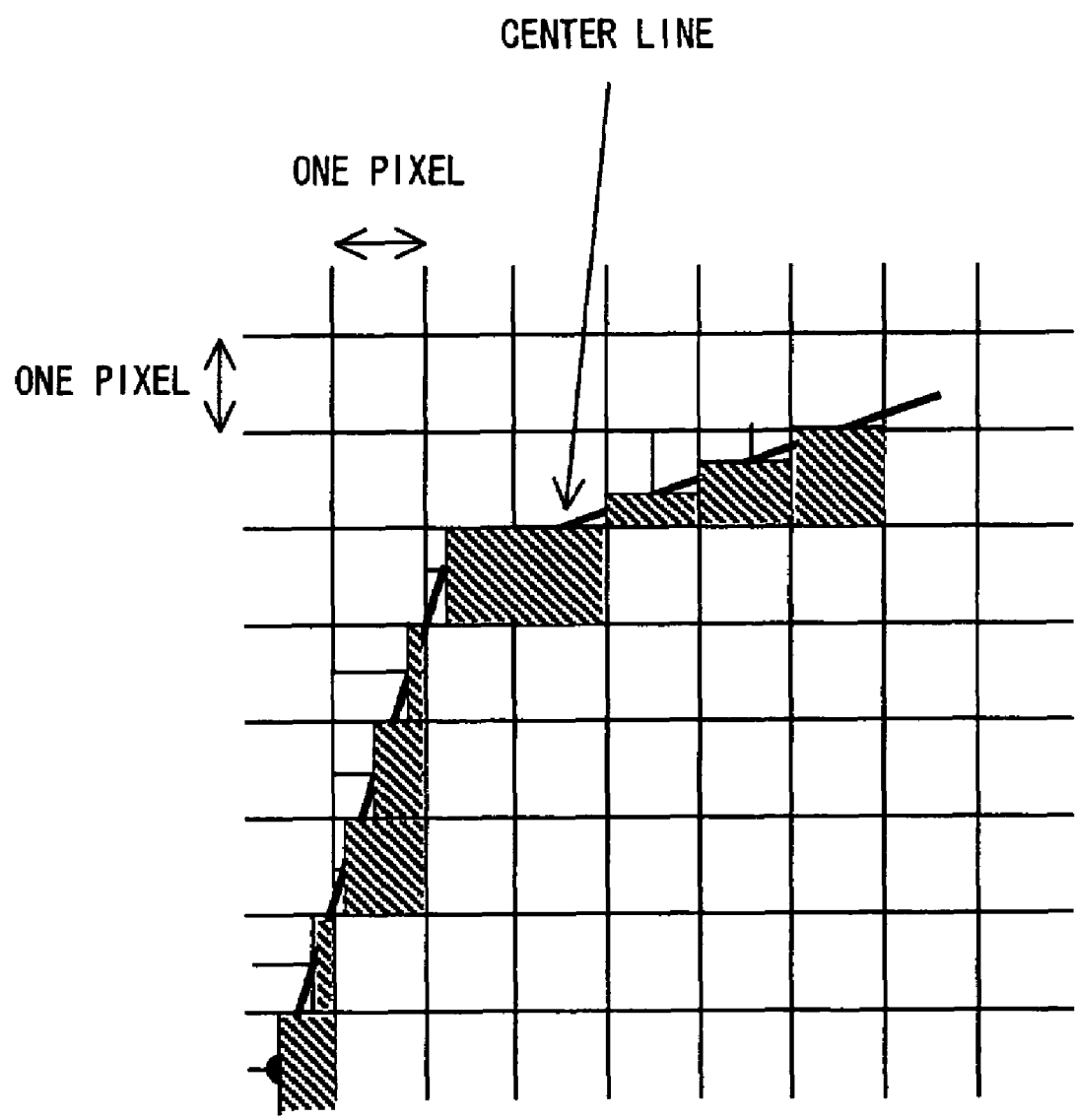
FIG. 22 shows a rectangular area in the case where the gradation value of each line element of outline font obtained in the fifth preferred embodiment is calculated.

FIG. 22 shows a rectangular area in the case where the gradation value of each line element of outline font obtained in this preferred embodiment is calculated.

Since by subdividing the character coordinate system into 64 or more of display coordinate systems, a gradation value is also subdivided in accordance with it, resolution for realizing high print quality can be obtained.

Thus, a gradation value can be calculated based on an area ration of a rectangular portion to each pixel.

The Sixth Preferred Embodiment

In this preferred embodiment, a gradation value in a character outline is determined using the outline calculated in the second preferred embodiment.

Figure 23:
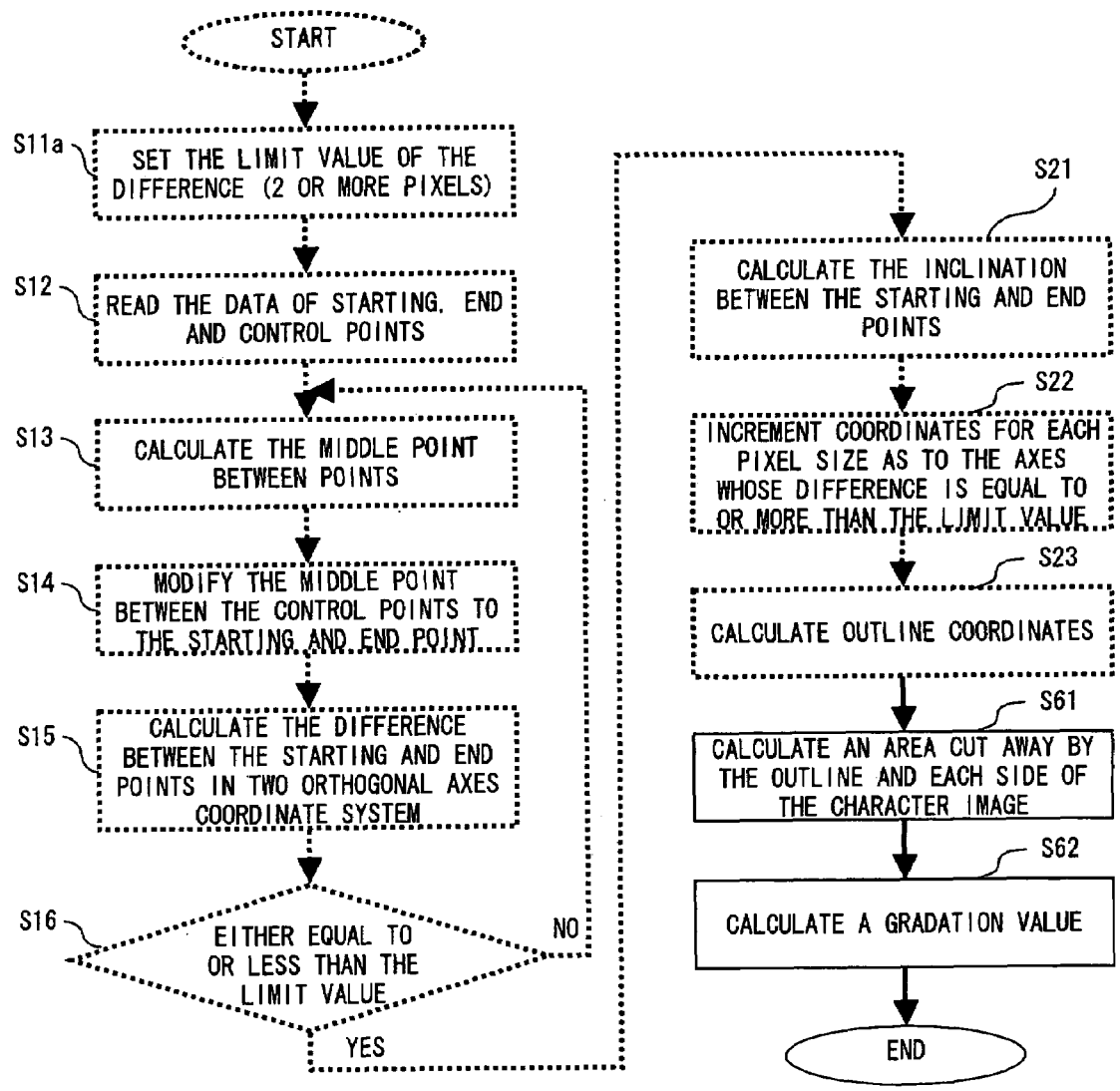
FIG. 23 is a flowchart showing the process of generating outline font and setting gradation in an outline in the sixth preferred embodiment.

FIG. 23 is a flowchart showing the process of generating outline font and setting gradation in an outline in this preferred embodiment. The character outline generation unit 7 executes this flow. In FIG. 23, firstly, outline coordinates are obtained by implementing the second preferred embodiment (S11a-S23 in FIG. 15). Then, an area to be cut away by an outline and each side of a character image is calculated (S61). Then, a gradation is calculated (S62).

Figure 24:
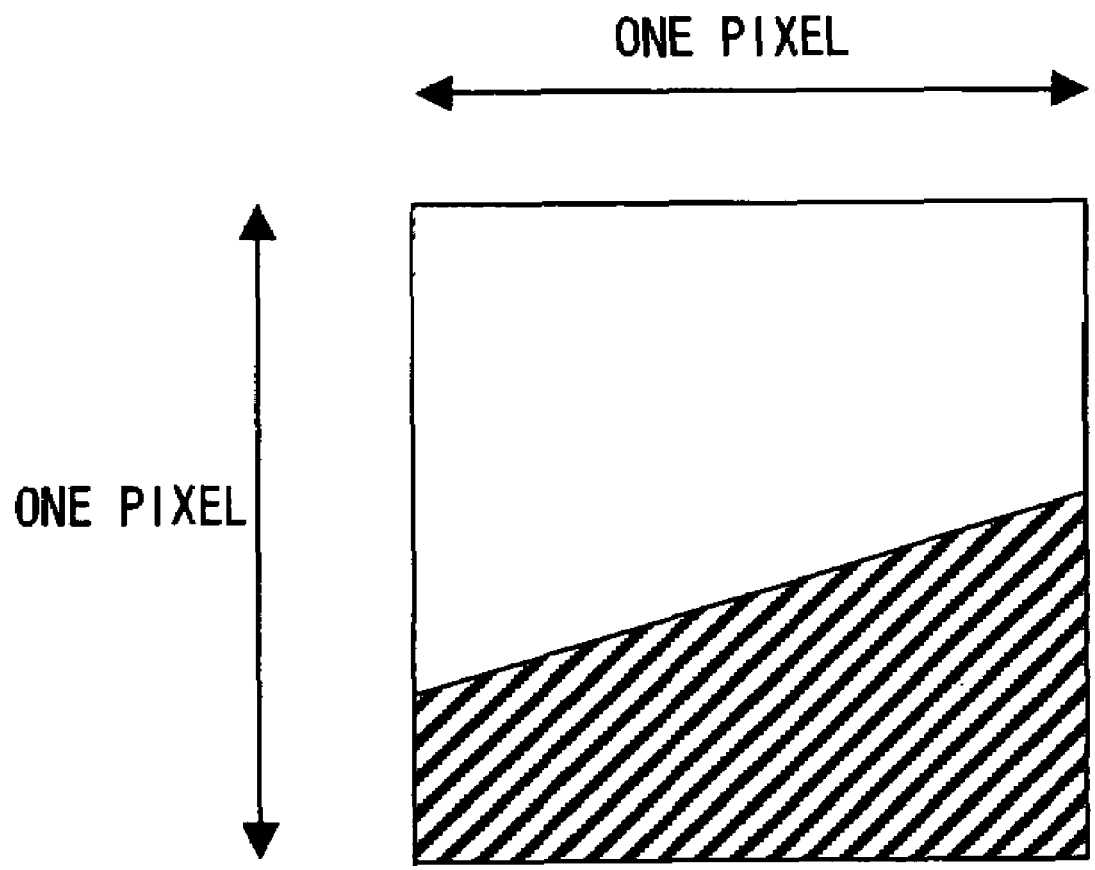
FIG. 24 shows how to calculate an area when determining gradation in the sixth preferred embodiment.

FIG. 24 shows how to calculate an area when determining gradation in this preferred embodiment. In this preferred embodiment, an area enclosed by an outline forming a character outline and a side in the character image, of each pixel (slashed portion) is calculated. In this case, the area ratio of the slashed portion to one pixel becomes (area of a slashed portion)/(area of one pixel). Therefore, a gradation value can be calculated as follows.

Gradation value=entire gradation value×(area of a slashed portion)/(area of one pixel)

For example, if area distribution is 0.5 against one pixel, a gradation value is 128 against the entire gradation values of 255.

Figure 25:
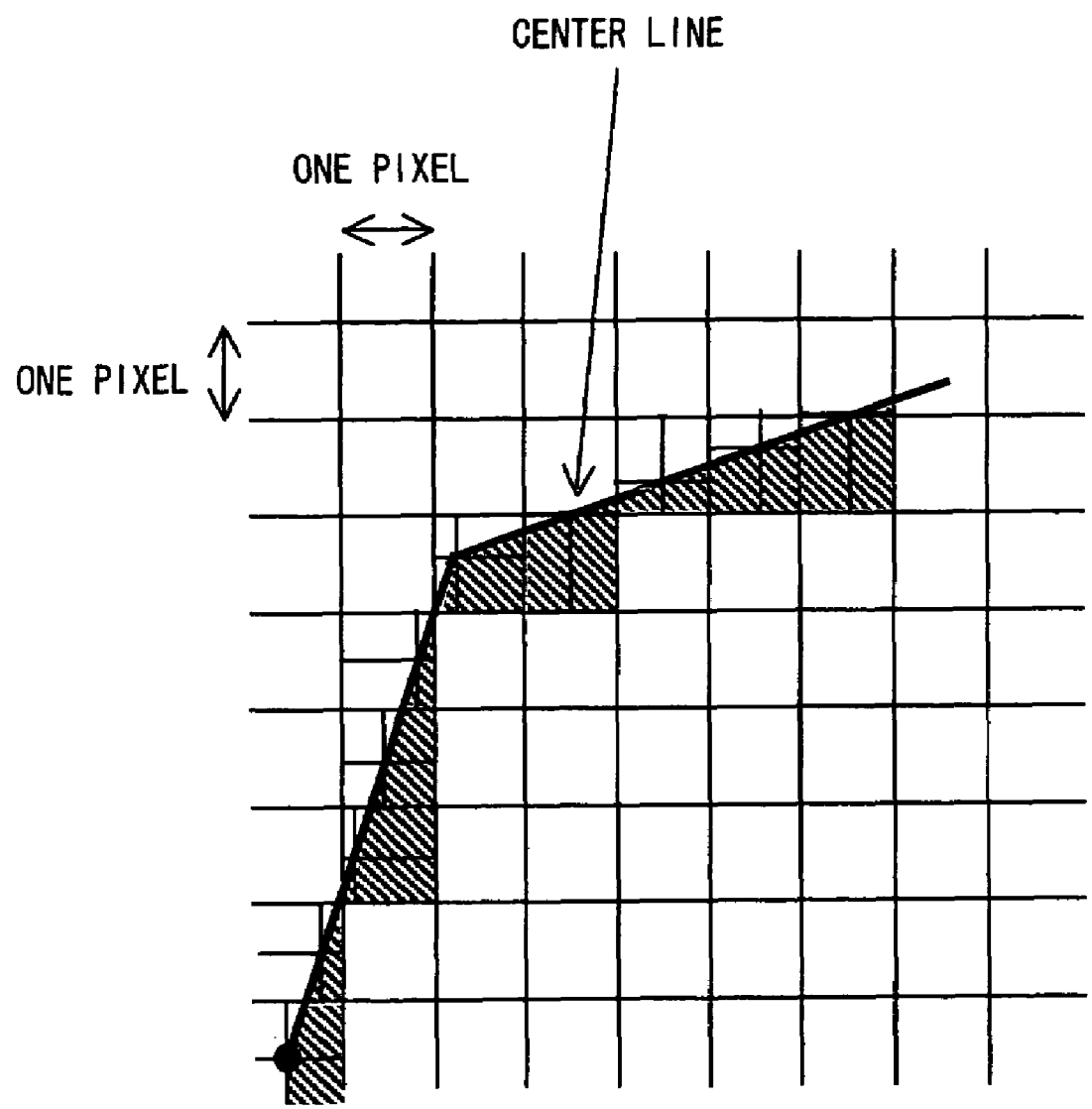
FIG. 25 shows an area cut by the outline and each side of a character image when calculating the gradation value of each line element of outline font obtained in the fifth preferred embodiment.

FIG. 25 shows an area cut by the outline and each side of a character image when calculating the gradation value of each line element of outline font obtained in this preferred embodiment.

Thus, a gradation value can be calculated based on the area ratio of a slashed portion to each pixel.

The Seventh Preferred Embodiment

In this preferred embodiment, a gradation value in a character outline is determined using the outline calculated in the third preferred embodiment.

Figure 26:
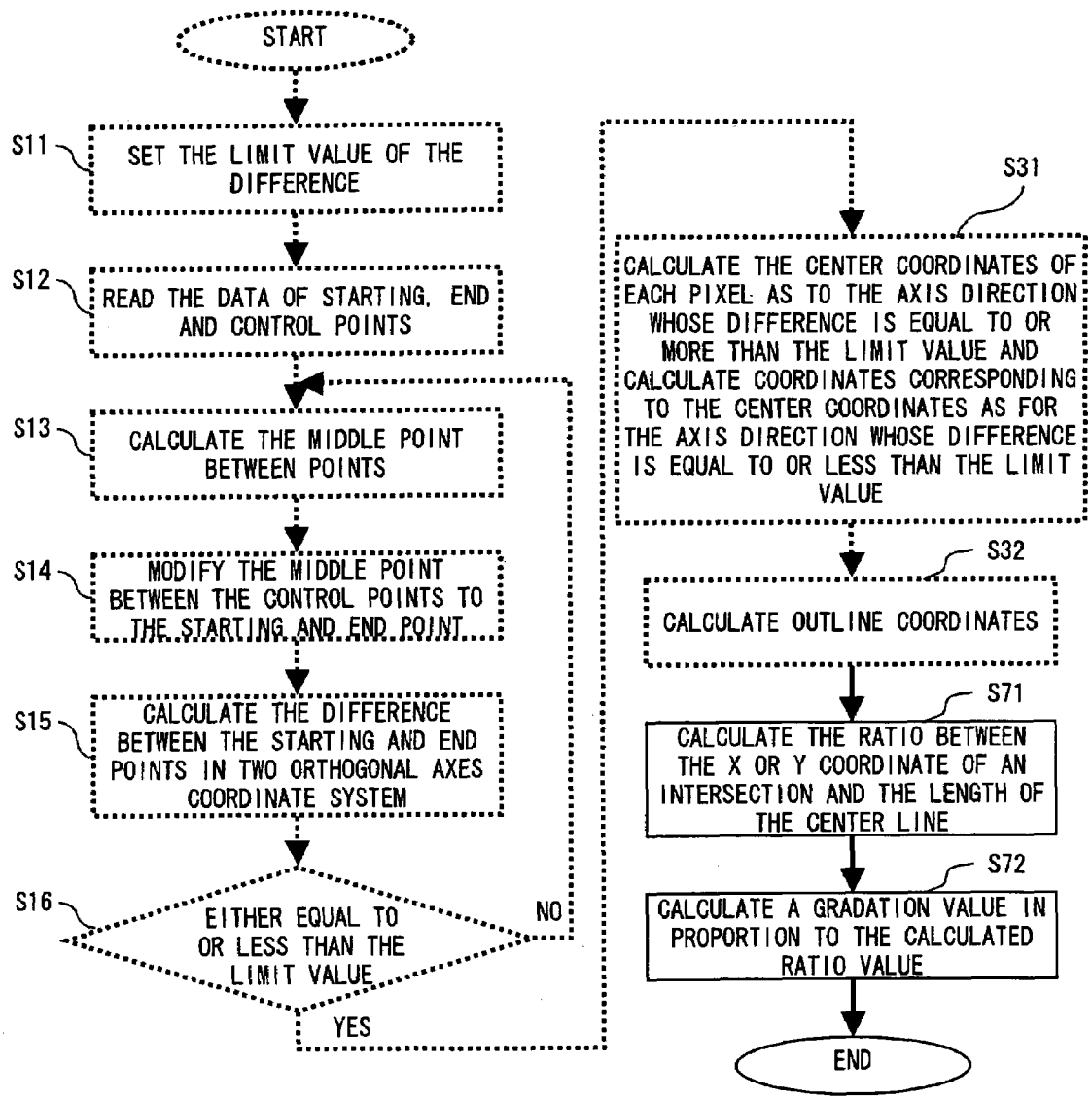
FIG. 26 is a flowchart showing the process of generating outline font and setting gradation in an outline in the seventh preferred embodiment.

FIG. 26 is a flowchart showing the process of generating outline font and setting gradation in an outline in this preferred embodiment. The character outline generation unit 7 executes this flow. In FIG. 26, outline coordinates are obtained by implementing the third preferred embodiment (S11-S32 in FIG. 16). The ratio in height of the location coordinates of an intersection to length of a center line is calculated (S71), and a gradation value proportional to the ratio value is calculated (S72).

Figure 27:
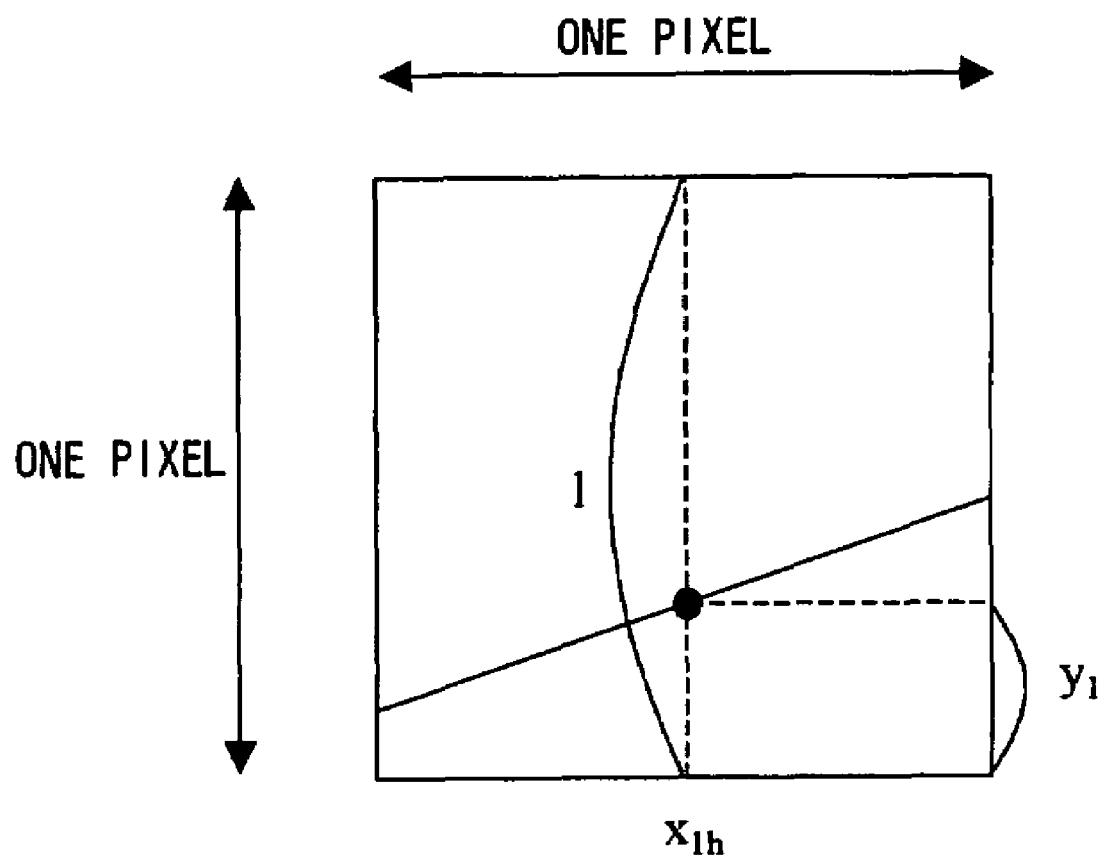
FIG. 27 shows how to calculate an area for determining gradation in the seventh preferred embodiment.

FIG. 27 shows how to calculate an area for determining gradation in this preferred embodiment. In FIG. 27, assuming the length of the center line of a pixel to be 1, the ratio of the Y coordinate of an intersection to the length of the center line is calculated and is specified as a gradation value.

Firstly, assuming the center coordinates in the X coordinate of one pixel to be $x_{1h}$, Y coordinate $y_1$ on the outline, corresponding to $x_{1h}$ is calculated. In this case, the ratio of the location coordinates of an intersection to a center line is $y_1/1$.

Therefore, assuming that gradation value=entire gradation value×($y_1/1$), a gradation value can be calculated. For example, if the ratio of the location coordinates of an intersection to a center line is 0.5 against pixel size of 1, a gradation value is 128 against the entire gradation value of 255.

Thus, a gradation value can be calculated based on the ratio of the location coordinates of an intersection to a center line.

The Eighth Preferred Embodiment

Figure 28:
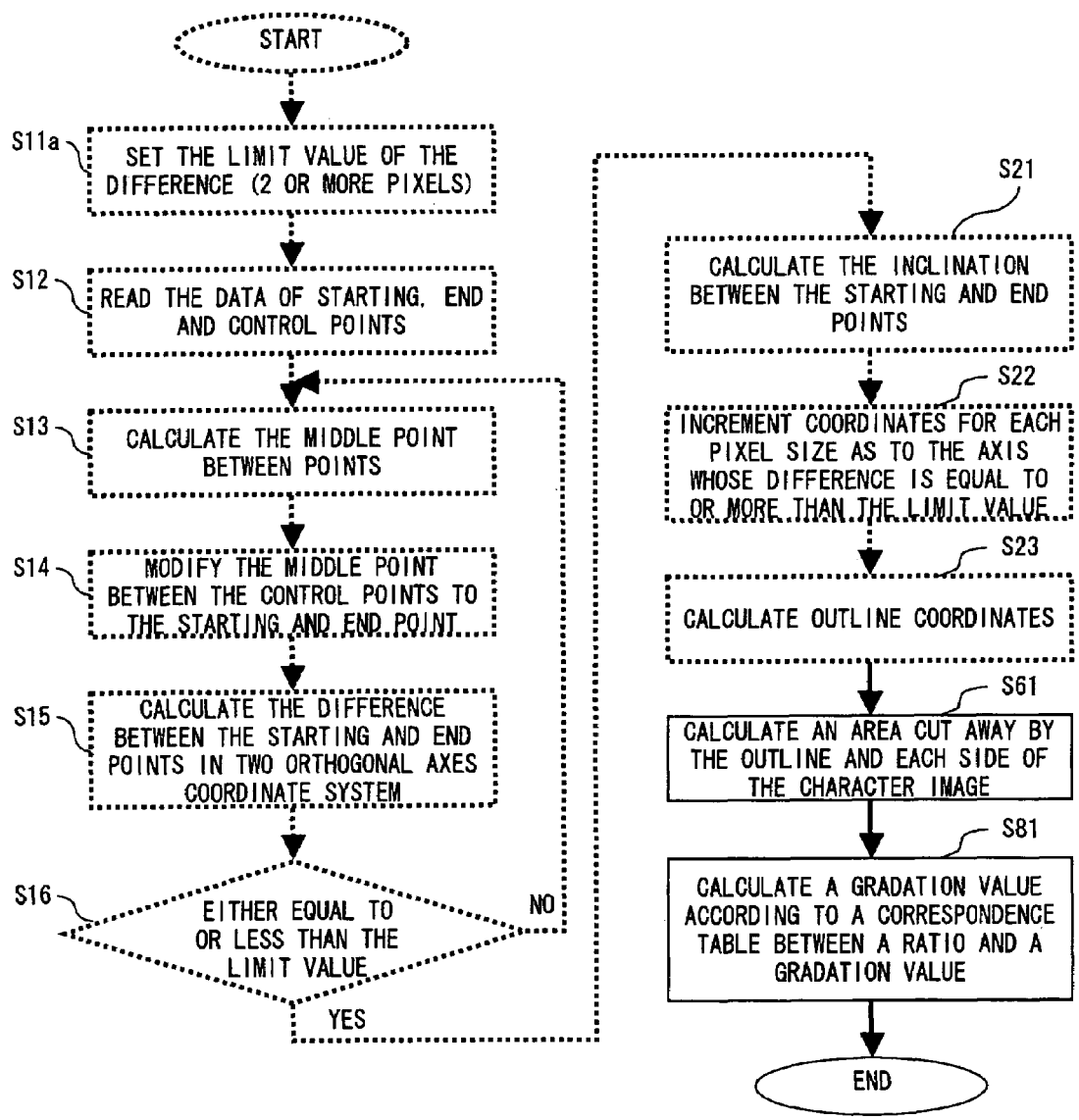
FIG. 28 is a flowchart showing the process of generating outline font and setting gradation in an outline in the eighth preferred embodiment.

FIG. 28 is a flowchart showing the process of generating outline font and setting gradation in an outline in this preferred embodiment. The character outline generation unit 7 executes this flow. In FIG. 28, outline coordinates are obtained by implementing the sixth preferred embodiment, and an area cut away by an outline and each side of a character image is calculated (S11a-S61). Then, the ratio of the area cut away by an outline and each side of a character image to the area of one pixel is calculated. Then, a gradation value is calculated based on the reference table shown in FIG. 29 or 30 (S81).

The area ratio is calculated as in the sixth preferred embodiment. In this case, the area ratio of the slashed portion to the pixel becomes (area of slashed portion)/(area of one pixel).

FIG. 29 shows an example of a correspondence table for determining a gradation value in this preferred embodiment (No. 1). FIG. 29 shows an example of the correspondence table in the case where an area and a gradation value are in linear proportion. If the area ratio is 2/2.5, a gradation value is 2 according to the table in FIG. 29.

It is OK even if an area and a gradation value are not in linear proportion. Therefore, a gradation value can also be obtained using a characteristic peculiar to an LCD display device, such as a γ characteristic value.

FIG. 30 shows an example of a correspondence table for determining a gradation value in this preferred embodiment (No. 2). In this correspondence table, a gradation value corresponding to any area ratio is a γ characteristic. For example, if the area ratio is 0.006, a gradation value is 5 according to the table in FIG. 30.

As described above, according to this preferred embodiment, an outline can be displayed with optimal gradation by selecting a corresponding table according to a display environment and usage.

The first through eighth preferred embodiments can also be combined according to usage.

Using the present invention, in a display device mounted on built-in equipment, processing speed can be improved while suppressing the quality degradation of a character image.

What is claimed is:

1. A character image generation system for generating outline font based on character information including a character code and font information and displaying the outline font on a display with a prescribed number of pixels, comprising:

an acquisition unit for obtaining the character information;

a character outline information storage unit for storing character outline information corresponding to the character information;

a subdivision unit for subdividing a curve expressed by the character outline information;

a difference calculation unit for calculating a difference between coordinates at each end of the subdivided curve;

a comparison unit for comparing the difference with a threshold value determined on the basis of a resolution of the display, to approximate a line element of the outline font to a straight line; and an outline coordinate calculation unit for sequentially calculating coordinates for each of the pixels, based on a result of the comparison and specifying the coordinates as the coordinates of an outline of each pixel, wherein subdivision unit performs the subdivision until a line element between the coordinates can be approximated to a straight line, based on the result of the comparison by the comparison unit.

2. The character image generation system according to claim 1, wherein the difference is expressed by two orthogonal axes coordinate system composed of a first factor and a second factor, and when said comparison unit determines that either value of the first factor or the second factor is equal to or less than the threshold value, said subdivision unit terminates.

3. The character image generation system according to claim 2, wherein said outline coordinate calculation unit sequentially calculates coordinates for each pixel from one end of the subdivided curve toward the other end in a direction indicated by a factor different from a factor in which said comparison unit determines that the difference is equal to or less than the threshold value.

4. The character image generation system according to claim 1, further comprising an inclination calculation unit for calculating inclination between both the ends, based on the coordinates at each end of the subdivided curve, wherein said outline coordinate calculation unit sequentially calculates coordinates for each pixel, based on the inclination and specifies the coordinates as coordinates of an outline of each pixel.

5. The character image generation system according to claim 3, wherein the coordinates calculated for each pixel is center coordinates of each pixel in a direction indicated by a factor different from a factor in which said comparison unit determines that the difference is equal to or less than the threshold value.

6. A character image generation system for generating outline font based on character information including a character code and font information and displaying the outline font on a display with a prescribed number of pixels, comprising:

an acquisition unit for obtaining the character information;

a character outline information storage unit for storing character outline information corresponding to the character information;

a subdivision unit for subdividing a curve expressed by the character outline information;

a difference calculation unit for calculating a difference between coordinates at each end of the subdivided curve;

a comparison unit for comparing the difference with a predetermined threshold value;

an outline coordinate calculation unit for sequentially calculating coordinates for each of the pixels, based on a result of the comparison and specifying the coordinates as the coordinates of an outline of each pixel; and a character outline gradation setting unit for setting gradation of a pixel forming the character outline, based on the calculation result of said outline coordinate calculation unit, wherein the character outline gradation setting unit calculates the gradation, based on an area ratio between an area of one pixel forming the character outline and a rectangular area whose side includes the coordinates calculated by said outline coordinate calculation unit or an ratio between an area of one pixel forming the character outline and an area cut way by the outline in a pixel forming the character outline.

7. The character image generation system according to claim 6, further comprising a correspondence table storage unit for storing a correspondence table in which a gradation value corresponding to the ratio between the area of one pixel forming the character outline and the rectangular area or a correspondence table in which a gradation value corresponding to the ratio between the area of one pixel forming the character outline and the area of the cut portion, wherein said character outline gradation setting unit sets the gradation, based on the correspondence table.

8. A character image generation system for generating outline font based on character information including a character code and font information and displaying the outline font on a display with a prescribed number of pixels, comprising:

an acquisition unit for obtaining the character information;

a character outline information storage unit for storing character outline information corresponding to the character information;

a subdivision unit for subdividing a curve expressed by the character outline information;

a difference calculation unit for calculating a difference between coordinates at each end of the subdivided curve, wherein the difference is expressed by two orthogonal axes coordinate system composed of a first factor and a second factor;

a comparison unit for comparing the difference with a predetermined threshold value, wherein when said comparison unit determines that either value of the first factor or the second factor is equal to or less than the threshold value, said subdivision unit terminates;

an outline coordinate calculation unit for sequentially calculating coordinates for each of the pixels, based on a result of the comparison and specifying the coordinates as the coordinates of an outline of each pixel, wherein said outline coordinate calculation unit sequentially calculates coordinates for each pixel from one end of the subdivided curve toward the other end in a direction indicated by a factor different from a factor in which said comparison unit determines that the difference is equal to or less than the threshold value; and a character outline gradation setting unit for setting gradation of a pixel forming the character outline, based on the calculation result of said outline coordinate calculation unit, wherein the coordinates calculated for each pixel is center coordinates of each pixel in a direction indicated by a factor different from a factor in which said comparison unit determines that the difference is equal to or less than the threshold value, and the length of the center line is equal to the length of one side of the pixel, and said character outline gradation setting unit calculates an intersection between a center line of each pixel forming the character outline expressed by the outline and the outline and calculates the gradation, based on a ratio between the length of the center line and a distance between one end of the center line and the intersection.

9. The character image generation system according to claim 8, further comprising a correspondence table storage unit for storing a correspondence table in which a gradation value corresponding to the ratio between the length of the center line and a distance between one end of the center line and the intersection, wherein said character outline gradation setting unit sets the gradation, based on the correspondence table.

10. A storage medium on which is recorded a character image generation program for enabling a computer to execute a process of generating outline font, based on character information including a character code and font information and displaying the outline font on a display with a prescribed number of pixels comprising:

an acquiring process for obtaining the character information;

a subdivision process for obtaining the character information from a character outline information storage unit for storing character outline information corresponding to the character information and subdividing a curve expressed by the character outline information;

a difference calculation process for calculating a difference between coordinates at each end of the subdivided curve;

a comparison process for comparing the difference with a threshold value determined on the basis of a resolution of the display, to approximate a line element of the outline font to a straight line; and an outline coordinate calculation process for sequentially calculating coordinates for each pixel, based on a result of the comparison and specifying the coordinates as the coordinates of an outline of each pixel, wherein the subdivision process performs the subdivision until a line element between the coordinates can be approximated to a straight line, based on the result of the comparison by the comparison process.

11. The storage medium according to claim 10, wherein the difference is expressed by two orthogonal axes coordinate system composed of a first factor and a second factor, and when said comparison process determines that either value of the first factor or the second factor is equal to or less than the threshold value, said subdivision process terminates.

12. The storage medium according to claim 11, wherein said outline coordinate calculation process sequentially calculates coordinates for each pixel from one end of the subdivided curve toward the other end in a direction indicated by a factor different from a factor in which in said comparison process it is determined that the difference is equal to or less than the threshold value.

13. The storage medium according to claim 10, further comprising an inclination calculation process for calculating inclination between both the ends, based on the coordinates at each end of the subdivided curve, wherein said outline coordinate calculation process sequentially calculates coordinates for each pixel, based on the inclination.

14. The storage medium according to claim 12, wherein the coordinates calculated for each pixel is center coordinates of each pixel in a direction indicated by a factor different from a factor in which in said comparison process it is determined that the difference is equal to or less than the threshold value.

15. A storage medium on which is recorded a character image generation program for enabling a computer to execute a process of generating outline font, based on character information including a character code and font information and displaying the outline font on a display with a prescribed number of pixels comprising:

an acquiring process for obtaining the character information;

a subdivision process for obtaining the character information from a character outline information storage unit for storing character outline information corresponding to the character information and subdividing a curve expressed by the character outline information;

a difference calculation process for calculating a difference between coordinates at each end of the subdivided curve;

a comparison process for comparing the difference with a predetermined threshold value;

an outline coordinate calculation process for sequentially calculating coordinates for each pixel, based on a result of the comparison and specifying the coordinates as the coordinates of an outline of each pixel; and a character outline gradation setting process for setting gradation of a pixel forming the character outline, based on a calculation result of said outline coordinate calculation process, wherein the character outline gradation setting process calculates the gradation, based on an area ratio between an area of one pixel forming the character outline and a rectangular area whose side includes the coordinates calculated in said outline coordinate calculation process or an ratio between an area of one pixel forming the character outline and an area cut way by the outline in a pixel forming the character outline.

16. The storage medium according to claim 15, wherein said character outline gradation setting process sets the gradation, based on an area ratio between an area of one pixel forming the character outline and a rectangular area whose side includes the coordinates calculated in said outline coordinate calculation process or an ratio between an area of one pixel forming the character outline and an area cut way by the outline in a pixel forming the character outline.

17. A storage medium on which is recorded a character image generation program for enabling a computer to execute a process of generating outline font, based on character information including a character code and font information and displaying the outline font on a display with a prescribed number of pixels comprising:

an acquiring process for obtaining the character information;

a subdivision process for obtaining the character information from a character outline information storage unit for storing character outline information corresponding to the character information and subdividing a curve expressed by the character outline information;

a difference calculation process for calculating a difference between coordinates at each end of the subdivided curve, wherein the difference is expressed by two orthogonal axes coordinate system composed of a first factor and a second factor;

a comparison process for comparing the difference with a predetermined threshold value, wherein when said comparison process determines that either value of the first factor or the second factor is equal to or less than the threshold value, said subdivision process terminates; and an outline coordinate calculation process for sequentially calculating coordinates for each pixel, based on a result of the comparison and specifying the coordinates as the coordinates of an outline of each pixel, wherein said outline coordinate calculation process sequentially calculates coordinates for each pixel from one end of the subdivided curve toward the other end in a direction indicated by a factor different from a factor in which in said comparison process it is determined that the difference is equal to or less than the threshold value; and a character outline gradation setting process for setting gradation of a pixel forming the character outline, based on a calculation result of said outline coordinate calculation process, wherein said character outline gradation setting process calculates an intersection between a center line of each pixel forming the character outline expressed by the outline and the outline and calculates the gradation, based on a ratio between the length of the center line and a distance between one end of the center line and the intersection, wherein the coordinates calculated for each pixel is center coordinates of each pixel in a direction indicated by a factor different from a factor in which in said comparison process it is determined that the difference is equal to or less than the threshold value.

18. The storage medium according to claim 17, wherein said character outline gradation setting process sets the gradation, based on a correspondence table in which a gradation value corresponding to the ratio between the length of the center line and a distance between one end of the center line and the intersection.

19. A character image generation method for generating outline font based on character information including a character code and font information and displaying the outline font on a display with a prescribed number of pixels, comprising:

obtaining the character information;

obtaining the character information from a character outline information storage unit for storing character outline information corresponding to the character information and subdividing a curve expressed by the character outline information;

calculating a difference between coordinates at each end of the subdivided curve;

comparing the difference with a threshold value determined on the basis of a resolution of the display, to approximate a line element of the outline font to a straight line;

sequentially calculating coordinates for each of the pixels, based on a result of the comparison and specifying the coordinates as the coordinates of an outline of each pixel; and displaying the outline font on a display, wherein the subdividing performs the subdivision until a line element between the coordinates can be approximated to a straight line, based on the result of the comparison.

20. The character image generation method according to claim 19, wherein the difference is expressed by two orthogonal axes coordinate system composed of a first factor and a second factor, and when as a result of the comparison it is determined that either value of the first factor or the second factor is equal to or less than the threshold value, the subdivision of the curve terminates.

* * * * *

UNITED STATES PATENT AND TRADEMARK OFFICE
CERTIFICATE OF CORRECTION

PATENT NO. : 7,339,588 B2
APPLICATION NO. : 11/237758
DATED : March 4, 2008
INVENTOR(S) : Satoshi Iwata et al.

It is certified that error appears in the above-identified patent and that said Letters Patent is hereby corrected as shown below:

On the Title page, item (73), Assignee -- Morisawa & Company Ltd., Osaka (JP) -- should be added.

Signed and Sealed this

Seventh Day of July, 2009

JOHN DOLL
*Acting Director of the United States Patent and Trademark Office*